United States Patent
Sindhwani

(10) Patent No.: US 11,565,412 B2
(45) Date of Patent: Jan. 31, 2023

(54) GENERATING A ROBOT CONTROL POLICY FROM DEMONSTRATIONS COLLECTED VIA KINESTHETIC TEACHING OF A ROBOT

(71) Applicant: Google LLC, Mountain View, CA (US)

(72) Inventor: Vikas Sindhwani, Hastings on Hudson, NY (US)

(73) Assignee: GOOGLE LLC, Mountain View, CA (US)

( * ) Notice: Subject to any disclaimer, the term of this patent is extended or adjusted under 35 U.S.C. 154(b) by 531 days.

(21) Appl. No.: 16/622,027

(22) PCT Filed: Sep. 15, 2018

(86) PCT No.: PCT/US2018/051255
§ 371 (c)(1),
(2) Date: Dec. 12, 2019

(87) PCT Pub. No.: WO2019/055883
PCT Pub. Date: Mar. 21, 2019

(65) Prior Publication Data
US 2020/0189099 A1 Jun. 18, 2020

Related U.S. Application Data

(60) Provisional application No. 62/641,535, filed on Mar. 12, 2018, provisional application No. 62/559,285, filed on Sep. 15, 2017.

(51) Int. Cl.
*B25J 9/16* (2006.01)
*G06N 20/10* (2019.01)
(Continued)

(52) U.S. Cl.
CPC .......... *B25J 9/1664* (2013.01); *G05B 19/423* (2013.01); *G06N 3/0454* (2013.01); *G06N 3/08* (2013.01);
(Continued)

(58) Field of Classification Search
CPC ..... B25J 9/1664; G06N 20/10; G06N 3/0454; G06N 3/08; G05B 2219/39271
See application file for complete search history.

(56) References Cited

U.S. PATENT DOCUMENTS 6,064,168 A * 5/2000 Tao ......................... B25J 9/1607
318/568.22
6,285,920 B1 * 9/2001 McGee ................. G05B 19/423
318/568.14

(Continued)

OTHER PUBLICATIONS

European Patent Office; Intention to Grant issued in Application No. 18842594.6; 55 pages; dated Nov. 11, 2021.

(Continued)

*Primary Examiner* — Luis A Martinez Borrero
(74) *Attorney, Agent, or Firm* — Middleton Reutlinger

(57) ABSTRACT

Techniques are described herein for generating a dynamical systems control policy. A non-parametric family of smooth maps is defined on which vector-field learning problems can be formulated and solved using convex optimization. In some implementations, techniques described herein address the problem of generating contracting vector fields for certifying stability of the dynamical systems arising in robotics applications, e.g., designing stable movement primitives. These learning problems may utilize a set of demonstration trajectories, one or more desired equilibria (e.g., a target point), and once or more statistics including at least an average velocity and average duration of the set of demonstration trajectories. The learned contracting vector fields may induce a contraction tube around a targeted (Continued)

trajectory for an end effector of the robot. In some implementations, the disclosed framework may use curl-free vector-valued Reproducing Kernel Hilbert Spaces.

19 Claims, 10 Drawing Sheets

(51) Int. Cl.
  *G06N 3/04* (2006.01)
  *G06N 3/08* (2006.01)
  *G05B 19/423* (2006.01)
(52) U.S. Cl.
  CPC ... *G06N 20/10* (2019.01); *G05B 2219/39271* (2013.01)

(56) References Cited

U.S. PATENT DOCUMENTS

| | | | | |
|---|---|---|---|---|
| 7,292,913 | B2* | 11/2007 | Tokutake | G05B 19/409 700/246 |
| 8,121,731 | B2* | 2/2012 | Ban | G05B 19/425 901/3 |
| 8,386,069 | B2* | 2/2013 | Hartmann | G05B 19/41815 318/568.14 |
| 8,412,379 | B2* | 4/2013 | Gerio | B25J 13/06 901/1 |
| 9,207,668 | B2* | 12/2015 | Zhang | B25J 9/1664 |
| 9,221,174 | B2* | 12/2015 | Negishi | B25J 9/1656 |
| 9,242,376 | B2* | 1/2016 | Iwasaki | B25J 9/1664 |
| 9,393,687 | B2* | 7/2016 | Hietmann | B25J 9/0081 |
| 9,919,422 | B1* | 3/2018 | Horton | B25J 9/1656 |
| 9,925,662 | B1* | 3/2018 | Jules | G05B 19/423 |
| 10,207,404 | B2* | 2/2019 | Khansari Zadeh | B25J 9/163 |
| 10,391,632 | B2* | 8/2019 | Khansari Zadeh | G06V 20/10 |
| 11,188,821 | B1* | 11/2021 | Kalakrishnan | B25J 9/1664 |
| 11,213,946 | B1* | 1/2022 | Bai | G06N 20/00 |
| 11,420,328 | B2* | 8/2022 | El Khadir | B25J 9/023 |
| 2005/0027398 | A1* | 2/2005 | Tokutake | G05B 19/427 318/568.12 |
| 2007/0030271 | A1* | 2/2007 | Kamiya | B25J 9/1664 345/442 |
| 2012/0239193 | A1* | 9/2012 | Mizutani | G05B 19/423 700/250 |
| 2015/0217445 | A1* | 8/2015 | Hietmann | B25J 9/0081 901/4 |
| 2016/0176046 | A1* | 6/2016 | Zimmermann | B25J 9/1694 700/254 |
| 2016/0242690 | A1 | 8/2016 | Principe et al. | |
| 2016/0288332 | A1* | 10/2016 | Motoyoshi | B25J 13/085 |
| 2017/0083826 | A1 | 3/2017 | Kisilev et al. | |
| 2018/0157248 | A1* | 6/2018 | Lee | B25J 9/1666 |
| 2018/0222045 | A1* | 8/2018 | Khansari Zadeh | G06V 20/10 |
| 2019/0086907 | A1* | 3/2019 | Oestergaard | B25J 9/1656 |
| 2019/0118375 | A1* | 4/2019 | Khansari Zadeh | G06V 20/10 |
| 2019/0344439 | A1* | 11/2019 | Khansari Zadeh | B25J 9/1664 |
| 2020/0276704 | A1* | 9/2020 | Sindhwani | G06N 20/00 |
| 2021/0125052 | A1* | 4/2021 | Tremblay | G06N 3/084 |
| 2021/0178585 | A1* | 6/2021 | Rozo | B25J 9/163 |
| 2022/0040861 | A1* | 2/2022 | El Khadir | B25J 9/1666 |
| 2022/0108215 | A1* | 4/2022 | Choromanski | G06N 20/00 |

OTHER PUBLICATIONS

Khansari-Zadeh, S. et al. "Learning Stable Nonlinear Dynamical Systems with Gaussian Mixture Models"; IEEE Transactions on Robotics, vol. 27, No. 5, pp. 943-957, Oct. 1, 2011.
Khansari-Zadeh, S. "A Dynamical System-based Approach to Modeling Stable Robot Control Policies via Imitation Learning"; retrieved from internet URL:https://infoscience.epfl.ch/record/182663/files/EPFL_TH5552.pdf [retrieved on Feb. 18, 2019], 253 pages, Jan. 1, 2012.
Havoutis, I. et al. "Motion Planning and Reactive Control on Learnt Skill Manifolds"; International Journal of Robotics Research, vol. 32, No. 9-10, pp. 1120-1150, Jun. 28, 2013.
Howard, M. et al. "A Novel Method for Learning Policies from Variable Constraint Data"; Autonomous Robots, Kluwer Academic Publishers, BO, vol. 27, No. 2, pp. 105-121, Jul. 30, 2009.
European Patent Office; International Search Report and Written Opinion of Ser. No. PCT/US2018/051255; 5 pages; dated Feb. 26, 2019.
Khansari-Zadeh et al., "Learning Potential Functions from Human Demonstrations with Encapsulated Dynamic and Compliant Behaviors" Autonomous Robots. 23 pages, dated 2015.
Khansari-Zadeh et al., "Learning Control Lyapunov Function to Ensure Stability of Dynamical System-based Robot Reaching Motions" Robotics and Autonomous Systems, vol. 62, No. 6, pp. 752-765 dated Mar. 3, 2014.
Amir Ali Ahmadi "Algebraic Relaxations and Hardness Results in Polynomial Optimization and Lyapunov Analysis" arXiv: 1201.2892v1 [math.OC] dated Jan. 13, 2012.
Alvarez et al., "Kernels for Vector-Valued Functions: A Review" A Review, Foundation and Trends in Machine Learning, vol. 4, No. 3, pp. 195-266, dated 2011.
Zvi Artstein, "Stabilization with Relaxed Controls" Nonlinear Analysis, Theory, Methods & Applications, vol. 7, No. 11. pp. 1163-1173. dated 1983.
Barry et al., "Safety Verification of Reactive Controllers for UAV Flight in Cluttered Environments using Barrier Certificates" 7 pages.
Peter Bartlett, "Reproducing Kernel Hilbert Spaces" CS281B/Stat241B (Spring 2008) Statistical Learning Theory. 4 pages.
Freeman et al., "Control Lyapunov Functions: New Ideas From an Old Source" 6 pages.
Giesl et al., "Review on Computational Methods for Lyapunov Functions" Discrete and Continuous Dynamical Systems Series B, vol. 20, Nos. 8. Retrieved from doi:10.3934/dcdsb.2015.20.2291. pp. 2291-2331, dated Oct. 2015.
Oussama Khatib, "Real-Time Obstacle Avoidance for Manipulators and Mobile Robots" The International Journal of Robotics Research, vol. 5, No. 1, 9 pages, dated 1986.
Micchelli et al., "On Learning Vector-Valued Functions" Department of Computer Science, University College London, 24 pages. dated Jul. 14, 2003.
Micheli et al., "Matrix-valued Kernels for Shape Deformation Analysis" arXiv:1308.5739v2 [math.FA] dated Sep. 3, 2013.
Amir Ali Ahmadi, "Non-monotonic Lyapunov Functions for Stability of Nonlinear and Switched Systems: Theory and Computation" Massachusetts Institute of Technology. 90 pages, dated Jun. 2008.
Ha Quang Minh, "Operator-Valued Bochner Theorem, Fourier Feature Maps for Operator-Valued Kernels, and Vector-Valued Learning" arXiv:1608.05639v1 [cs.LG] 31 pages, dated Aug. 19, 2016.
Cogill et al., "Structured semidefinite programs for the control of symmetric systems" Science Direct, Automatica 44 (2008) pp. 1411-1417, dated Mar. 5, 2008.
Primbs et al., "Nonlinear Optimal Control: A Control Lyapunov Function and Receding Horizon Perspective" Asian Journal of Control, vol. 1, No. 1, pp. 14-24, dated Mar. 1999.
Sindhwani et al., "Scalable Matrix-valued Kernel Learning for High-dimensional Nonlinear Multivariate Regression and Granger Causality" arXiv:1210.4792v2 [stat ML] dated Mar. 8, 2013.
Slotine et al., "Applied Nonlinear Control" Prentice Hall. 476 pages, dated 1991.
Eduardo D. Sontag, "A 'universal' construction of Artstein's theorem on nonlinear stablization" Systems & Control Letters 13 (1989) 117-123, 7 pages, dated Mar. 7, 1989.
Eduardo D. Sontag, "Mathematical Control Theory: Deterministic Finite-Dimensional Systems" IEEE Transactions Automatic Control. 4 pages.
Zhang et al., "Learning with Invariance via Linear Functionals on Reproducing Kernel Hilbert Space". 9 pages.

(56) References Cited

OTHER PUBLICATIONS

Freeman et al., "Inverse Optimality in Robust Stabilization" Siam J. Control and Optimization, vol. 34, No. 4, pp. 1365-1391, 27 pages, dated Jul. 1996.
P.A. Parrilo, "Structured semidefinite programs and semialgebraic geometry methods in robustness and optimization" PhD thesis, California Institute of Technology, 135 pages, dated 2000.
European Patent Office; Intention to Grant issued in Application No. 18842594.6, 55 pages, dated Jun. 1, 2022.

* cited by examiner

GENERATING A ROBOT CONTROL POLICY FROM DEMONSTRATIONS COLLECTED VIA KINESTHETIC TEACHING OF A ROBOT

BACKGROUND

Various techniques have been proposed to enable robots to perform various tasks. For example, some techniques enable a user to kinesthetically teach the robot to follow a particular trajectory. For instance, the user may physically manipulate a robot arm to cause a reference point of an end effector of the robot arm to traverse the particular trajectory—and that particular traversed trajectory may thereafter be repeatable by the robot arm. As another example, while a user uses his or her arm to perform a task like moving to and grasping an object, a camera or other device may obtain visual samples of the movement to determine a trajectory of a reference point of the user's arm, which may then be repeated by a robot arm. However, those and other techniques may suffer from one or more drawbacks, such as those described herein.

The classical way to record a particular trajectory is to generate a time-indexed trajectory, e.g., of individual waypoints. This recorded trajectory can be used as a robot control policy. Whatever the starting point of the end effector reference point, the policy may cause the robot to identify the closest individual waypoint of the time-indexed trajectory, move the end effector reference point to that way point, and then move it along the remainder of the trajectory. However, this technique may not yield optimal results in terms of time required to traverse the trajectory and/or robot wear and tear. Moreover, a robot operating in accordance with such a simple control policy may not be well-suited to deal with dynamic obstacles in the environment.

By contrast, in a dynamical systems approach to feedback control, robot motion during a task (for example reaching a cup) is formulated as a differential equation, rather than as a time-indexed trajectory. Such a representation allows better generalization since instead of memorizing the demonstration trajectories, the policy has to capture the essential dynamics underlying the task during training. Additionally a dynamical systems policy can, by construction, adapt to changes in dynamic environments, making it suitable for use in unstructured environments. However, existing dynamical systems techniques employ non-convex optimization for dynamic fitting and constructing Lyapunov functions, and consequently are prone to sub-optimal local minima.

SUMMARY

Techniques are described herein for utilizing vector-valued Reproducing Kernel Hilbert spaces (RKHS), contraction analysis, and convex optimization to learn stable, nonlinear dynamical systems for robot control. For example, in various implementations, techniques described herein are used to generate a dynamical systems control policy that includes one or more vector fields. These vector fields may, in effect, induce a contraction tube around a robot trajectory that is generated from imitation learning.

In some implementations, a plurality of kernels may be generated (e.g., randomly, selected, etc.), each with local equilibria that are placed at a desired location of a set of locations, such as a set of waypoints recorded during imitation learning. In some implementations, these kernels may be matrix-valued kernels, and may take various forms, such as curl-free kernels or Gaussian separable kernels. In some implementations, techniques described herein may begin with any base matrix-valued kernel, determine an RKHS associated with the kernel, and use the RKHS as a subspace of vector fields that are guaranteed to vanish on a desired set of equilibrium points, e.g., at least some of the waypoints generated during imitation learning.

In various implementations, one or more vector fields may be generated based on the plurality of kernels, e.g., based on their associated RKHS's. In some implementations, convex optimization may be employed on the kernels, e.g., to fit them to Gaussian mixture models. Additionally or alternatively, convex optimization may be applied when generating a linear combination of the kernels and/or to the linear combination after generated. One benefit of convex optimization, as contrasted to non-convex optimization, is that it has finite dimensionality. These vector fields may then be employed as a robot control policy by a robot.

Suppose a robot is instructed to traverse its end effector—more particularly, a reference point of its end effector—along a particular robot trajectory. Suppose further that the particular robot trajectory was learned previously, e.g., using imitation learning, and that techniques described herein were used to generate a robot control policy for this particular trajectory. In various implementations, no matter where the end effector reference point starts out, even if well outside the intended trajectory, it may follow the vector fields (e.g., gradient field) defined in the control policy towards a contraction tube induced around the intended trajectory by the control policy. Should the robot encounter an obstacle, e.g., a moving or transient object in a dynamic environment, the robot can use the policy to avoid the obstacle and merge back into the contract tube to resume the intended trajectory.

Techniques described herein give rise to various technical advantages. For example, techniques described herein significantly improve training time required to generate robot control policies, which also conserves computing resources. Moreover, control policies (e.g., vector fields) generated using techniques described herein can be quickly updated and/or recomputed as needed, e.g., to account for changes in an environment (perturbations) in which a robot operates. And as noted previously, other techniques for generating dynamical systems control policies often have sub-optimal local minima, e.g., due to being generated using non-convex optimization.

Some implementations of this specification are directed to methods and apparatus for generating a robot control policy based on data points that are based on robot sensor data generated during one or more "kinesthetic teachings," such as physical manipulations of the robot by a user or by visual observed movements of a user's arm. Such a control policy may regulate both robot motion and robot interaction with the environment. A physical manipulation of a robot may involve the user physically interacting with a robot to cause a reference point of the robot to move along a trajectory from a starting point to a target point. As one particular example, the user may cause a reference point of an end effector of the robot to move to a "target point" that is an electrical outlet (i.e., a kinesthetic teaching of placing a plug in the electrical outlet). This user-caused movement results in the robot traversing a multi-dimensional trajectory that can be described (e.g., by collected sensor data of the robot) in both robot work space and configuration space. With a visual observation of movement of a user, a reference point of the user's appendage may be observed to determine a similar multi-dimensional trajectory that can be described (e.g., by collected sensor data of the robot) in both robot work space and configuration space. In some implementations, users may also draw multi-dimensional trajectories on a graphical user interface, which may be deemed a kinesthetic teaching.

As used herein, the term "demonstration" refers to a group of data points for a corresponding kinesthetic teaching of a robot. As used herein, the term "data point" refers to data that describes a state of a robot at a corresponding time of the data point, and that also optionally describes additional parameters at the corresponding time. The state of the robot may be described in joint space (e.g., as the positions of each of the actuators of the robot) and/or task space (e.g., as the position and orientation of an end effector or other component of the robot). The state of the robot for a given data point can be based on sensor data from sensor(s) (e.g., joint position sensors) of the robot at a corresponding point in time (e.g., the state may strictly conform to the sensor data at the point in time). The additional parameter(s) that may also be described by a data point include, for example, stiffness and/or other parameter(s). The additional parameter(s) may be based on user input, other robot sensor data, etc. Moreover, as described herein, various further parameters may be assigned (i.e., stored in association with in one or more computer readable media) to each of a plurality of data points of a demonstration. For example, damping parameter(s), smoothness parameter(s), a prior weight, and/or a potential gradient may be assigned to a data point as described in detail herein. Additional description is provided herein of demonstrations and data points.

In some implementations, generating the control policy includes using the data points of one or more demonstrations in learning a non-parametric potential function for use in the control policy, where the learned non-parametric potential function has a global minimum that is based on a target point(s) (i.e., "end" data point(s)) of the demonstration(s) used in generating the control policy. In some of those implementations, the data points are further used in learning a dissipative field for use in the control policy. In some implementations, in learning the potential function and/or the dissipative field, constrained optimization problem(s) are solved using the data points as known parameters. The generated control policy enables a robot to move from any initial configuration to a desired target position: (1) from any of a plurality of "starting" states; (2) while adapting its motion in real-time to changing environmental conditions; and/or (3) while adapting stiffness and/or other parameters of the robot.

Implementations of this specification are related to various improvements in generating such a control policy that regulates both motion control and robot interaction with the environment and/or that includes a learned non-parametric potential function and/or dissipative field. In various implementations, the improvements improve performance of the control policy, improve learning of the potential function and/or dissipative field of the control policy, and/or achieve other benefits. Some implementations additionally or alternatively relate to automatically determining a potential gradient for one or more (e.g., all) data points, and generating a control policy using the automatically determined potential gradient.

In some implementations, a method performed by a control system of a robot is provided. The method includes receiving a group of data points generated based on sensor data from one or more sensors obtained during imitation learning of a robot trajectory. The imitation learning includes physical manipulation of a reference point from an initial point to a target point. The method further includes generating a dynamical systems control policy that regulates both robot motion and robot interaction with an environment. Generating the dynamical systems control policy includes generating a plurality of kernels based on the group of data points. The kernels are generated based on convex optimization. Generating the dynamical systems control policy further includes generating one or more vector fields based on the plurality of kernels. The one or more vector fields collectively form the dynamical systems control policy. The method further includes controlling one or more robots based on the dynamical systems control policy.

These and other implementations of technology disclosed herein may optionally include one or more of the following features.

In some implementations, the dynamical systems control policy includes one or more differential equations. In those implementations, the plurality of kernels are matrix-valued kernels. In some of those implementations, equilibria of the plurality of kernels are placed at respective data points of the group of data points.

In some implementations, the plurality of kernels comprise neural networks. In other implementations, the plurality of kernels comprise curl-free kernels. In yet other implementations, the plurality of kernels comprise Gaussian separable kernels.

In some implementations, the one or more vector fields comprise a plurality of Reproducing Kernel Hilbert spaces (RKHS) associated with the plurality of kernels.

Other implementations may include one or more non-transitory computer readable storage media storing instructions executable by a processor (e.g., a central processing unit (CPU) or graphics processing unit (GPU)) to perform a method such as one or more of the methods described above. Yet another implementation may include a system of one or more computers and/or one or more robots that include one or more processors operable to execute stored instructions to perform a method such as one or more (e.g., all) aspects of one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
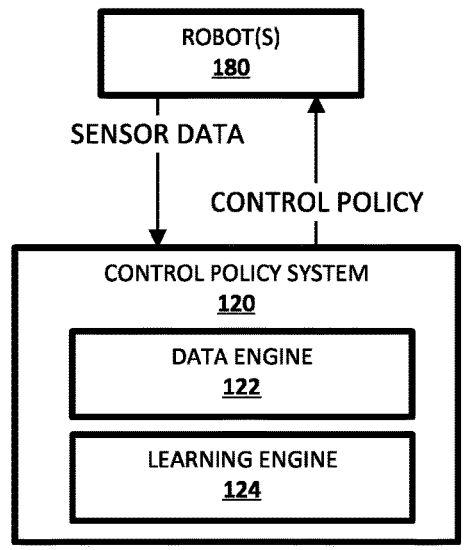
FIG. 1 illustrates an example environment in which a robot control policy may be generated according to various implementations disclosed herein.

Implementations of this specification are related to various improvements in generating a control policy that regulates both motion control and robot interaction with the environment and/or that includes a learned non-parametric potential function and/or dissipative field. In some implementations, the improvements improve performance of the control policy, improve learning of the potential function and/or dissipative field of the control policy, and/or achieve other benefits.

In some implementations, a continuous nonlinear dynamical system evolving in a space, $\mathbb{R}^n$, may be represented as:

$$\dot{x} = \frac{dx}{dt} = f(x),$$
$$x \in \mathbb{R}^n,$$
$$f: \mathbb{R}^n \to \mathbb{R}^n$$

Starting from an initial condition, $x_0$, a trajectory $x(t,x_0)$ is generated by integrating the dynamical system of Equation 1 over a time horizon. Given desired equilibria, $Z = \{x_*^i, i=1 \ldots k\}$ and pairs $\{(x_*^i, \dot{x}_*^i), t=0 \ldots T_i, i=1 \ldots N\}$ extracted from a plurality of sets of demonstration trajectories, where k is a number of equilibrium points where the induced vector field vanishes, i.e., $\dot{x}_*^i = f(x_*^i) = 0$. The following optimization may be performed over a non-parametric family, $\mathcal{H}^Z$, of vector-valued maps vanishing on the desired equilibria, Z:

$$\min_{f: \mathbb{R}^n \to \mathbb{R}^n \in \mathcal{H}^Z} \sum_{i,t} \|f(x_t^i) - \dot{x}_t^i\|_2^2 + \lambda \|f\|_{\mathcal{H}^Z}^2 \quad \text{(Equation 1)}$$

$$\text{subject to: } \frac{1}{2}\left[J_f(x_t^i) + J_f(x_t^i)^T\right] \leq -\tau(x_t^i)I, \forall i, t \quad \text{(Equation 2)}$$

where $$J_f = \frac{\partial f}{\partial x}$$

denotes the Jacobian of the vector-valued map $f$ and the notation $A \leq -\tau I$ implies that the matrix A is negative definite with eigenvalues no larger than $-\tau$ for some $\tau > 0$.

In some implementations, the first term of Equation 1 uses a least squares criterion to orient the vector field along the demonstration trajectories. In some implementations, the second term of Equation 1 controls smoothness of the vector field. The $\lambda > 0$ term is a regularization parameter that balances the first term and the second term of Equation 1.

In some implementations, the constraints of Equation 2 ensure incremental stability. Additionally, the constraints of Equation 2 help induce a contraction tube around an intended trajectory, such that the dynamical system evolution from a large set of initial conditions returns to the intended trajectory.

In some implementations, the optimization problem, set forth in Equation 1 and Equation 2, is performed over the non-parametric spaces of smooth vector-valued functions $\mathcal{H}$. In some implementations, the non-parametric spaces is rooted in vector-valued Reproducing Kernel Hilbert Space (RKHS), which are generated by matrix-valued kernel functions. In some implementations, curl-free kernels may be utilized. For curl-free kernels, the resulting vector field may be a gradient flow.

In some implementations, RKHS properties may be used to construct a subspace of $\mathcal{H}$, denoted by $\mathcal{H}^Z$, of vector-valued functions that vanish on the set of points of desired equilibria, Z. In some implementations, the optimization problem, set forth in Equation 1 and Equation 2, is performed over $\mathcal{H}^Z$, where Z is the set of points of desired equilibria. In some implementations, the RKHS properties may imply a Representor Theorem, where the Representor Theorem specifies the form of the optimal vector field, and reduces the optimization problem, set forth in Equations 1 and Equation 2, to a finite dimensional convex optimization problem.

In some implementations, random feature approximation may be utilized. By using the random feature approximation to matrix-valued kernels, training time of the learnt dynamical system may be significantly improved.

One aspect of the present disclosure is a technique for performing the optimization problem, set forth in Equation 1 and Equation 2, to ensure stability in the dynamical system using a Lyapunov analysis.

In some implementations, a system is said to be globally asymptotically stable if solution trajectories $x(t,x_0)$ from any starting point $x_0$ converge to x, as $t \to \infty$. In some implementations, a system is said to be locally asymptotically stable if there a ball with radius r around $x_*$ where all initial states flow to $x_*$.

Lyapunov's direct method is a classical framework for verifying stability properties of nonlinear dynamical systems. If a suitable positive-definite scalar function can be found that decreases along the trajectories of the system, then the evolution of the system can be thought of as continuously dissipating a generalized notion of energy, eventually reaching an equilibrium point as a consequence. A ball rolling down a mountainous landscape to the deepest point in a valley is a useful mental image of a system evolving along an energy landscape induced by a Lyapunov function.

In some of these implementations, energy dissipation is stated as follows: if a dynamical system $\dot{x} = f(x)$ can be associated with a function V(x) that has a local or global minimum at x* and whose time derivative is negative everywhere or in the vicinity of x*, i.e., $$\dot{V}(x) = \frac{dV(x(t))}{dt} = \nabla V(x)^T f(x) < 0 \qquad \text{(Equation 3)}$$

then the system is certified to be at least one of locally or globally stable.

Converse Lyapunov theorems prove existence of Lyapunov functions for stable systems. However, despite these existence results, Lyapunov theory is largely unconstructive: it does not prescribe how to find Lyapunov functions for verifying the stability of a given general nonlinear system. There are, however, a few special cases where the construction is well-understood. For example, stable linear systems admit a quadratic Lyapunov function that can be found via semi-definite programming. If a polynomial dynamical system admits a polynomial Lyapunov function, then one can search for it using sum-of-squares techniques which also reduce to instances of semi-definite programming. Value functions found by approximate dynamic programming can be used as candidate Lyapunov functions since by definition they encode "cost-to-go" which decreases along the system dynamics. Particularly relevant to this disclosure are problems like Imitation Learning and Inverse Optimal Control where cost functionals are unknown, or in settings where closed-loop dynamics of policies without corresponding value functions needs to be studied.

Another aspect of the present disclosure is a technique for performing the optimization problem, set forth in Equation 1 and Equation 2, to ensure stability in the dynamical system using incremental stability and contraction analysis.

In some implementations, an approach using incremental stability and contraction analysis may be utilized. Incremental stability is concerned with the convergence of system trajectories with respect to each other, as opposed to stability with respect to a single equilibrium, as utilized in the Lyapunov analysis. Contraction analysis derives sufficient conditions under which the displacement between any two trajectories $x(t,x_0)$ and $x(t,x_1)$ starting from the initial conditions $x_0$ and $x_1$ will go to zero, or the target position. In some of these implementations, if $f$ is continuously differentiable, then $\dot{x}=f(x)$ implies the differential relation:

$$\delta \dot{x} = J_f(x)\delta x,$$

where $J_f = \frac{\partial f}{\partial x}$

In some of these implementations, the object $\delta x$, referred to hereinafter as virtual displacement, may be an infinitesimal spatial displacement between neighboring trajectories at a fixed time. Accordingly, the rate of change of the corresponding infinitesimal squared distance, $\delta x^T \delta x$, can be expressed as:

$$\frac{d}{dt}(\delta x^T \delta x) = 2\delta x^T \delta \dot{x} = \delta x^T J_f(x)\delta x$$

Therefore, if the symmetric part of the Jacobian of $f$ at x is negative definite, then the distance between neighboring trajectories decreases. In particular, if Equation 4 holds true for some smooth $\tau(x)>0$, $$\frac{1}{2}[J_f(x) + J_f(x)^T] \leq -\tau(x)I \qquad \text{(Equation 4)}$$

then the following may be implied, $$\frac{d}{dt}(\delta x^T \delta x) \leq -2\tau(x)\delta x^T \delta x$$

and integrating both sides of this equation yields, $$\|\delta x_t\|_2^2 \leq \|\delta x_0\| e^{-\int_0^t \tau(x)dt}$$

Accordingly, any infinitesimal length $\|\delta x\|$ converges exponentially to zero as time goes to infinity. This convergence implies that in a contraction region, i.e., the set of x's where Equation 4 holds true, trajectories will tend to converge towards an intended trajectory. In some implementations, id the entire state-space is contracting and a finite equilibrium exists, then the finite equilibrium is unique and all of the trajectories converge to the finite equilibrium.

Although the techniques disclosed herein focus on the infinitesimal length $\|\delta x\|$, this is for the sake of brevity and not meant to be limiting. For example, contraction analysis may more broadly consider generalized distances of the form $\delta x^T M(x)\delta x$ induced by a symmetric, positive definite matrix function $M(x)$. In some implementations, the search for a contraction metric may be interpreted as the search for a Lyapunov function of the specific form $V(x)=f(x)^T M(x) f(x)$.

Another aspect of the present disclosure is a technique for performing the optimization problem, set forth in Equation 1 and Equation 2, to ensure stability in the dynamical system for feedback of robotic motion during a task, e.g., reaching for an object located in a dynamic environment, by utilizing differential equations.

In some implementations, the dynamical system may be modeled using differential equations, as opposed to using time-indexed trajectories. This approach offers several advantages. First, by modeling the system using differential equations, a better generalization of a dynamical systems control policy may be generated because the control policy captures the underlying dynamics of the system rather than memorizing a set of demonstration trajectories. Second, the dynamical system control policy may adapt to changes in a dynamic environment, thus it is suitable for use in an unstructured environment. There are various approaches to modeling these dynamical systems using differential equations.

One approach utilizes Dynamic Movement Primitives (DMPs). DMPs are the most widely used dynamical system approaches used for both imitation learning and reinforcement learning. In some implementations, the dynamical system defined by DMPs is composed of two main terms: a nonlinear term to accurately encode a given demonstration trajectory, and a linear term that acts as a PD controller. In this approach, global stability is ensured by smoothly switching from the non-linear term to the stable, linear term via the variable. Thus, the phase variable in a DMP dynamical system make the system a time-varying system, which may make the DMP dynamical system sensate to perturbations. However, DMPs may only be trained from one degree-of-freedom of a demonstration trajectory at a trajectory. Accordingly, a DMP dynamical system does not provide any advantages in terms of training time for multiple training demonstrations and increasing dimensionality as compared to other techniques and approaches disclosed herein.

Another approach utilizes Stable Estimator of Dynamical Systems (SEDS). SEDS is another widely used dynamical system approach for learning nonlinear dynamical systems from a set of demonstration trajectories. In some implementations, SEDS may utilize a Gaussian mixture model to represent the dynamical system control policy, and may impose constraints on means and covariance of Gaussian mixtures to ensure global asymptotic stability of the trained model. The stability in SEDS is based on a simple quadratic Lyapunov function as disclosed herein. However, SEDS may only model trajectories whose distances to the target point decreases monotonically in time.

Another approach utilizes Control Lyapunov Function-based Dynamic Movements (CLF-DM). CLF-DM is another dynamical system approach for learning nonlinear dynamical systems. In some implementations, CLF-DM may learn a parametric Lyapunov function from a set of given demonstration trajectories. Various regression techniques may be utilized to learn an unstable dynamical system from the set of given demonstration trajectories. The learned control Lyapunov function may be utilized to derive a command to stabilize the learned unstable dynamical system from the set of given demonstration trajectories.

Among these approaches, SEDS and CLF-DM involve non-convex optimization for dynamics fitting and constructing Lyapunov functions respectively. Therefore, SEDS and CLF-DM are prone to sub-optimal local minima. The drawbacks of the DMP, SEDS, and CLF-DM approaches resulted in the development of a new approach.

The problem of estimating an unknown smooth vector field in $\mathbb{R}^n$ can be naturally formulated in terms of Tikhonov regularization in a vector-valued Reproducing Kernel Hilbert Space (RKHS). The theory and formalism of vector-valued RKHS has applications ranging from solving partial differential equations to machine learning. They may be viewed as a systematic generalization of more familiar family of kernel methods in machine learning.

To be an RKHS, any Hilbert Space $\mathcal{H}$ of vector fields in $\mathbb{R}^n$ must satisfy a natural continuity criteria as given in Definition 1.

Definition 1. A Hilbert Space $\mathcal{H}$ is an RKHS of vector fields in $\mathbb{R}^n$ if for any $v \in \mathbb{R}^n$, the linear functional that maps $f \in \mathcal{H}$ to $v^T f(x)$ is continuous. Any RKHS vector field over $\mathbb{R}^n$ can be associated with a matrix-valued kernel function $K: \mathbb{R}^n \times \mathbb{R}^n \to \mathbb{R}^{n \times n}$. In other words, for any inputs x,y in $\mathbb{R}^n$, K(x,y) returns an n×n matrix. Valid kernel functions are positive in the sense that for any finite set of points $\{x_i \in \mathbb{R}^n\}_{i=1}^l$, the ln×ln Gram matric of K defined by the n×n blocks, $G_{ij}=K(x_i,x_j)$, $1 \le i,j \le l$, is a positive definite. This may be characterized as Definition 2.

Definition 2. A Hilbert Space $\mathcal{H}$ of vector-valued functions mapping $\mathbb{R}^n \to \mathbb{R}^n$, with inner product denoted by $\langle .,. \rangle_{\mathcal{H}}$, is a RKHS if there is a positive matrix-valued function $K: \mathbb{R}^n \times \mathbb{R}^n \to \mathbb{R}^{n \times n}$ such that for all x,y $\in \mathbb{R}^n$: 1) the vector-valued map, K(.,x)y defined by z→K(z,x)y $\in \mathcal{H}$; and 2) for all $f \in \mathcal{H}$, the reproducing property holds:

$$\langle f, K(.,x)y \rangle_{\mathcal{H}} = f(x)^T y \qquad \text{(Equation 5)}$$

where K is called the reproducing kernel for $\mathcal{H}$

Conversely, any kernel K uniquely determines an RKHS which admits K as the reproducing kernel. This RKHS, denoted by $\mathcal{H}_K$, is defined to be the completion of the linear span of functions $\{K(.,x)y, x,y \in \mathbb{R}^n\}$ with an inner product given by $\langle \Sigma_i K(.,x_i)\alpha_i, \Sigma_j K(.,z_j)\beta_j \rangle_{\mathcal{H}_K} = \Sigma_{i,j} \alpha_i^T(x_i,z_j)\beta_j$. Due to the reproducing property, standard learning problems in a vector-valued RKHS can be turned into a finite dimensional optimization problem using a natural matrix-vector generalization of the classical Representer Theorem.

Representer Theorem. The optimal solution to any optimization problem of the form:

$$f^* = \operatorname{argmin}_{f \in \mathcal{H}_K} L(f(x_i) \ldots f(x_l)) + \lambda \|f\|^2_{\mathcal{H}_K},$$

is a sum of matrix-vector products of the form:

$$f^*(x) = \sum_{i=1}^{l} K(x, x_i)\alpha_i \qquad \text{(Equation 6)}$$

where $\alpha_i \in \mathbb{R}^n$, i=1 . . . l, L is an arbitrary loss function (which can also be an indicator function encoding arbitrary constraints on point evaluation) and $\lambda > 0$ is a regularization parameter. When the learning problem involves Jacobian evaluations, as in the optimization problem set forth in Equation 1 and Equation 2, and extended Representer Theorem may be required.

Form of Optimal Contracting RKHS Vector Field Theorem. The optimal solution to any vector field learning problem of the following form:

$$f^* = \operatorname{argmin}_{f \in \mathcal{H}_K} L(f(x_1) \ldots f(x_l); J_f(x'_1) \ldots J_f(x'_m)) + \lambda \|f\|^2_{\mathcal{H}_K}$$

is a sum of matrix-vector products of the form:

$$f^*(x) = \sum_{i=1}^{l} K(x, x_i)\alpha_i + \sum_{j=1}^{m}\sum_{k=1}^{n} \frac{\partial K(x, x'_j)}{\partial x_j} \beta_{jk} \qquad \text{(Equation 7)}$$

where $\alpha_i, \beta_{jk} \in \mathbb{R}^n$, L is an arbitrary loss function (which can also be an indicator function encoding arbitrary constraints on point evaluation) and $\lambda > 0$ is a regularization parameter. Equation 7 implies that the optimization problem, set forth in Equation 1 and Equation 2, can be reduced to a finite dimensional regression problem involving Linear Matrix Inequalities (LMIs) over the variables $\alpha_i, \beta_{jk}$.

In this approach, two types of matrix-valued kernels may be considered. The first type of matrix-valued kernel to consider are Gaussian separable kernels, and the second type of matrix-valued kernel to consider are curl-free kernels.

In some implementations, Gaussian separable kernels, $K_\sigma$, may be defined by the scalar Gaussian kernel $$k_\sigma(x, y) = e^{\frac{-\|x-y\|_2^2}{2\sigma^2}}$$

times the n×n identify matrix, such that it takes the form:

$$K_\sigma(x,y)=k_\sigma(x,y)I \qquad \text{(Equation 8)}$$

where each individual component of the vector field $f=(f_1 \ldots f_n)$ belongs to the scalar RKHS $\mathcal{H}_K$ associated with the standard Gaussian kernel. More generally, one may consider separable matrix-valued kernels of the form $$K(x, y) = e^{\frac{-\|x-y\|_2^2}{2\sigma^2}} L$$

L for a positive definite n×n matrix L.

In some implementations, curl-free kernels may be defined by the Hessian of the scalar Gaussian kernel:

$$K_{cf}(x, y) = \frac{1}{\sigma^2} e^{\frac{-\|x-y\|^2}{2\sigma^2}} \left[ I - \frac{(x-y)(x-y)^T}{\sigma^2} \right] \quad \text{(Equation 9)}$$

where vector fields in the associated RKHS are curl-free and can be interpreted as gradient flows with respect to a potential field V, i.e., $$\dot{x} = f(x) = -\nabla V(x)$$

Consequently, the Jacobian of $f$, $J_f = -\nabla^2 V$, at any x is symmetric being the Hessian of $-V$. From this, a formula is derived for V in Proposition 1.

Proposition 1. Let $f \in \mathcal{H}_{K_{cf}}$ have the form:

$$f(x) = \sum_{i=1}^{l} K_{cf}(x, x_i) \alpha_i$$

Then, $f(x) = \nabla V(x)$ where $V: \mathbb{R}^n \to \mathbb{R}$ has the form:

$$V(x) = -\sum_{i=1}^{l} \nabla_x k_\sigma(x, x_i)^T \alpha_i \quad \text{(Equation 10)}$$

In some implementations, a subspace of RKHS vector fields may vanish at one or more desired points. These desired points are equilibria of the dynamical system to be learned by the control policy. Let $Z = \{x^*_1 \ldots x^*_p\}$ be a set of points. Given $\mathcal{H}_{\mathcal{K}}$, the subset of functions that vanish on Z include:

$$\mathcal{H}_K^Z = \{ f \in \mathcal{H}_K : f(x^*_i) = 0 \in \mathbb{R}^n, x^*_i \in Z \}$$

In fact, $\mathcal{H}_K^Z$ is a closed subspace of $\mathcal{H}_{\mathcal{K}}$ and itself an RKHS associated a modified kernel function $K^Z$. From this, a formula is derived for $K^Z(x,y)$ in Proposition 2.

Proposition 2. Let $\mathcal{H}_K^Z \subseteq \mathcal{H}_{\mathcal{K}}$ be an RKHS whose matrix-valued kernel is given by:

$$K^Z(x,y) = K(x,y) - K(x,Z) K(Z,Z)^{-1} K(Z,y) \quad \text{(Equation 11)}$$

where, given any two sets of points $S = \{x_i \in \mathbb{R}^n\}_{i=1}^{l_1}$ and $S' = \{y_i \in \mathbb{R}^n\}_{i=1}^{l'}$, the Gram matrix of any matrix-valued kernel K on S,S', denoted by K(S', S) is the l'n×ln matrix defined by the n×n blocks, $G_{ij} = K(x_i, x_j) \in \mathbb{R}^{n \times n}$. Therefore, the approach may begin with any base matrix-valued kernel K, define $K^Z$ as in Equation 11, and use its associated RKHS as a space of vector fields that are guaranteed to vanish on Z, the desired set of equilibrium points.

In some implementations, this approach may provide faster solutions to the optimization problem, set forth in Equation 1 and Equation 2, by using random feature approximations. For example, the size of the problem using the full kernel expansion in Equation 7 grows as ln, the number of demonstration points times the dimensionality of the problem. In other words, by using the full kernel expansion, training time is slow for moderately long demonstrations, even in a low-dimensional setting. Further, by using the full kernel expansion, the learnt dynamical system is slow to evaluate and integrate at inference time. Accordingly, this approach may be modified by using random feature approximation to ensure optimal performance at inference time.

In some implementations, given a matrix-valued kernel K, a matrix-valued feature map $\Phi: \mathbb{R}^n \to \mathbb{R}^{D \times n}$ having the property that $$K(x,y) \approx \Phi(x)^T \Phi(y)$$

where D controls quality of the approximation. By using the approximation, a vector-valued RKHS map can be a reparameterized as follows:

$$f(x) = \sum_{i=1}^{l} K(x, x_i) \alpha_i \approx \sum_{i=1}^{l} \Phi(x)^T \Phi(x_i) \alpha_i = \Phi(x)^T \theta$$

where $$\theta = \sum_{i=1}^{l} \Phi(x_i) \alpha_i \in \mathbb{R}^D.$$

Therefore, instead of optimizing ln variables $\{\alpha_i \in \mathbb{R}^n, i=1 \ldots l\}$, the approach as modified by using random feature approximation only need to optimize D variables of $\theta$. The number of random approximation features, D, may depend on quality-time tradeoffs for a particular robotic application.

In some implementations, a feature map may be defined for approximating the kernels of Equation 8 and Equation 9. This may include a matrix-valued feature map for Gaussian separable kernels and curl-free kernels, and a feature map for random features vanishing on a point set.

In some of these implementations, the matrix-valued feature map for Gaussian separable kernels and curl-free kernels may define the random scalar feature map $\varphi(x): \mathbb{R}^n \to \mathbb{R}^s$ as:

$$\phi(x) = \sqrt{\frac{2}{s}} \begin{bmatrix} \cos(w_1^T x + b_1) \\ \vdots \\ \cos(w_s^T x + b_s) \end{bmatrix} \quad (12)$$

where $w_1, \ldots w_s$ are independent and identically distributed random variables from $N(0, \sigma^{-2} I)$, and $b_1, \ldots b_s$ are independent and identically distributed random variables from Unif$[0, 2\pi]$. Equation 12 induces a low-rank approximation to the Gaussian kernel (with bandwidth $\sigma$). Other shift invariant kernels also admit such approximations. Additionally, Equation 12 implies matrix-valued feature map approximations of:

$$K_G(x,y) \approx \Phi_G(x)^T \Phi_G(y), K_{cf}(x,y) \approx \Phi_{cf}(x)^T \Phi_{cf}(y)$$

for the Gaussian separable kernels of Equation 8 and the curl-free kernels of Equation 9, respectively, the associated feature maps may take the form:

$$\Phi_\sigma(x) = \phi(x) \otimes I \quad (13)$$

$$\Phi_{cf}(x) = \sqrt{\frac{2}{D}} \begin{bmatrix} \sin(w_1^T x + b_1) w_1^T \\ \vdots \\ \sin(w_D^T x + b_D) w_D^T \end{bmatrix} \quad (14)$$

where $\otimes$ denotes a Kronecker product.

In some implementations, much like generating a subspace of RKHS vector fields from K to $K^Z$, it may be desirable to generate a subspace of a matrix-value feature map from $\Phi$ to $\Phi^Z$, such that $\Phi^Z(x)$ vanishes on Z. For example, for a set of points $X=(x_1, \ldots, x_l)$, define:

$$\Phi(X)=[\Phi(x_1), \ldots, \Phi(x_X)] \in \mathbb{R}^{D \times nl}$$

Since $K(x,y) \approx (x)^T \Phi(y)$, $$\begin{aligned}K^Z(x, y) &= K(x, y) - K(x, Z)K(Z, Z)^{-1}K(Z, y) \\ &= \Phi(x)^T\Phi(y) - \Phi(x)^T\Phi(Z)(\Phi(Z)^T\Phi(Z))^{-1}\Phi(Z)^T\Phi(y) \\ &= \Phi(x)^T[I - \Phi(Z)(\Phi(Z)^T\Phi(Z))^{-1}\Phi(Z)^T]\Phi(y) \\ &= \Phi(x)^T[I - P_{\Phi(z)}]\Phi(y) \\ &= \Phi(x)^T P_{\Phi(z)}^\perp \Phi(y).\end{aligned}$$

where $P_M$ denotes the orthogonal projector onto the range of M. In some implementations, $P_{\Phi(z)}^{\perp}=LL^T$ for some $L \in \mathbb{R}^{D \times D}$. Accordingly, the feature map may be defined as:

$$\Phi^Z(x)=L^T\Phi(x) \quad \text{(Equation 15)}$$

which satisfies the property that $K^Z(x,y)=\Phi^Z(x)^T\Phi^Z(y)$. Note that despite the fact that kernel $K^Z(x,y)$ is not shift invariant, this particular construction inherits the ability to be expressed as a low-rank feature map wile guaranteeing that $\Phi^Z(x)$ vanishes on Z.

In some implementations, a regression with LMI constraints may be performed. For example, by using matrix-valued random feature approximation to kernels, the learned vector field may have the form:

$$\dot{x} = \Phi^Z(x)^T \theta = \sum_{i=1}^D \Phi_i^Z(x)\theta_i \quad \text{(Equation 16)}$$

where $\Phi^Z(x)^T=[\Phi_1^Z(x) \ldots \Phi_D^Z]$, $\Phi_i^T:\mathbb{R}^n \to \mathbb{R}^n$. Let $J_{\Phi_j^z}$ denote the n×n Jacobian matrix of $\Phi_i^Z$. Then, the optimization problem, set forth in Equation 1 and Equation 2, reduces to:

$$\min_{\theta \in \mathbb{R}^D} \sum_{i,t} \|\Phi^Z(x_t^i) - \dot{x}_t^i\|_2^2 + \lambda\|\theta\|_2^2 \quad \text{(Equation 17)}$$

$$\text{subject to: } \frac{1}{2}\sum_{j=1}^D \left[J_{\Phi_j^Z}(x_t^i) + J_{\Phi_j^Z}^T(x_t^i)\right]\theta_j \le -\tau(x_t^i)I \quad \text{(Equation 18)}$$

In some implementations, a regression with LMI constraints may be performed on the reduced optimization problem, set forth in Equation 17 and Equation 18. The regression solves the problems set forth herein while ensuring optimal performance at inference time. Note that the contraction constraints in Equation 18 may be enforced only for a subsample of points. Slack variables may be added to ensure feasibility.

Turning now to FIG. 1, an example environment is illustrated in which a robot control policy, which may include one or more contracting vector fields learned using techniques described herein, may be generated according to various implementations described herein. The example environment includes one or more robots 180 and a control policy system 120. Although the control policy system 120 is illustrated as separate from the robot(s) 180, in some implementations one or more aspects of the control policy system 120 may be implemented by a corresponding one of the one or more robots 180 (e.g., by one or more processors of the robot). For example, in some implementations each of the robot(s) 180 may include an instance of the control policy system 120. In some implementations, one or more (e.g., all) aspects of the control policy system 120 are implemented on a computing system that is separate from the robot(s) 180, such as one or remote computing devices and/or computing systems in network communication with the robot(s) 180. For example, one or more aspects of the control policy system 120 may be implemented by remote computing device(s), the robot(s) 180 may transmit (via one or more networks) data from demonstration(s) to the remote computing devices, the remote computing device(s) may generate the control policy based on the transmitted data, then transmit the generated control policy back to the robot(s) 180.

During a kinesthetic teaching/physical manipulation by a user of one of the robot(s) 180, sensor data is generated by the robot. The sensor data is provided to the control policy system 120. The control policy system 120 generates a group of data points based on the sensor data of the kinesthetic teaching and uses the group of data points in generating a control policy, e.g., by learning a contracting vector field based on a plurality of kernels as described herein. The control policy is provided for use by one or more of the robot(s) 180 (the same robot of the kinesthetic teaching and/or additional robot(s)). Such robot(s) 180 use the control policy to selectively control one or more of its actuators based on the control policy. For example, the control policy may be invoked by such robot(s) 180 in response to detection of an object associated with the control policy, a task associated with the control policy, etc.—and used by the robot in regulating both motion and interaction with the environment. As described herein, in some implementations, sensor data from multiple kinesthetic teachings are provided to the control policy system 120 and utilized by the system 120 in generating a single control policy, such as the contracting vector fields depicted in FIGS. 4B, 5B, 6B, and 7B, and in FIGS. 4C, 5C, 6C, and 7C. The sensor data from each of the kinesthetic teachings may be utilized to generate a corresponding demonstration/group of data points. Sensor data from multiple kinesthetic teachings may all be provided by the same robot and/or by different robots.

The control policy system 120 includes a data engine 122 and a learning engine 124. In some implementations, more or fewer engines may be provided. In some implementations, the data engine 122 samples a distributed group of data points and provides them to learning engine 124 for use in generating a control policy, e.g., by learning a contracting vector field based on a plurality of kernels as described herein. In some implementations, the data engine 122 additionally or alternatively automatically generates a potential gradient for a group of data points, assigns the potential gradient to the data points of the group, and provides the assigned potential gradient to learning engine 124 for use in generating a control policy.

The learning engine 124 generates a control policy using one or more groups of data points that are each based on robot sensor data from a corresponding kinesthetic teaching. In some implementations, in generating the control policy, the learning engine 124 utilizes the group(s) of data points in learning a non-parametric potential function, such as the contracting vector fields depicted in FIGS. 4B, 5B, 6B, and 7B, and in FIGS. 4C, 5C, 6C, and 7C, for use in the control policy. In some cases the non-parametric potential function may have a global minimum that is based on target point(s) of the group(s) of data points. In some of those implementations, the learning engine 124 further utilizes the group(s)

of data points in learning a dissipative field for use in the control policy. In some implementations, the learning engine 124 solves constrained optimization problem(s) in learning the potential function and/or the dissipative field. While the global minimum of a learned potential function will be based on target point(s) of the groups(s) of data points, it is understood that in many situations it will not strictly conform to the target point(s). Moreover, where multiple target point(s) of multiple group(s) are provided, it is understood that those target point(s) may not all strictly conform to one another.

Figure 2:
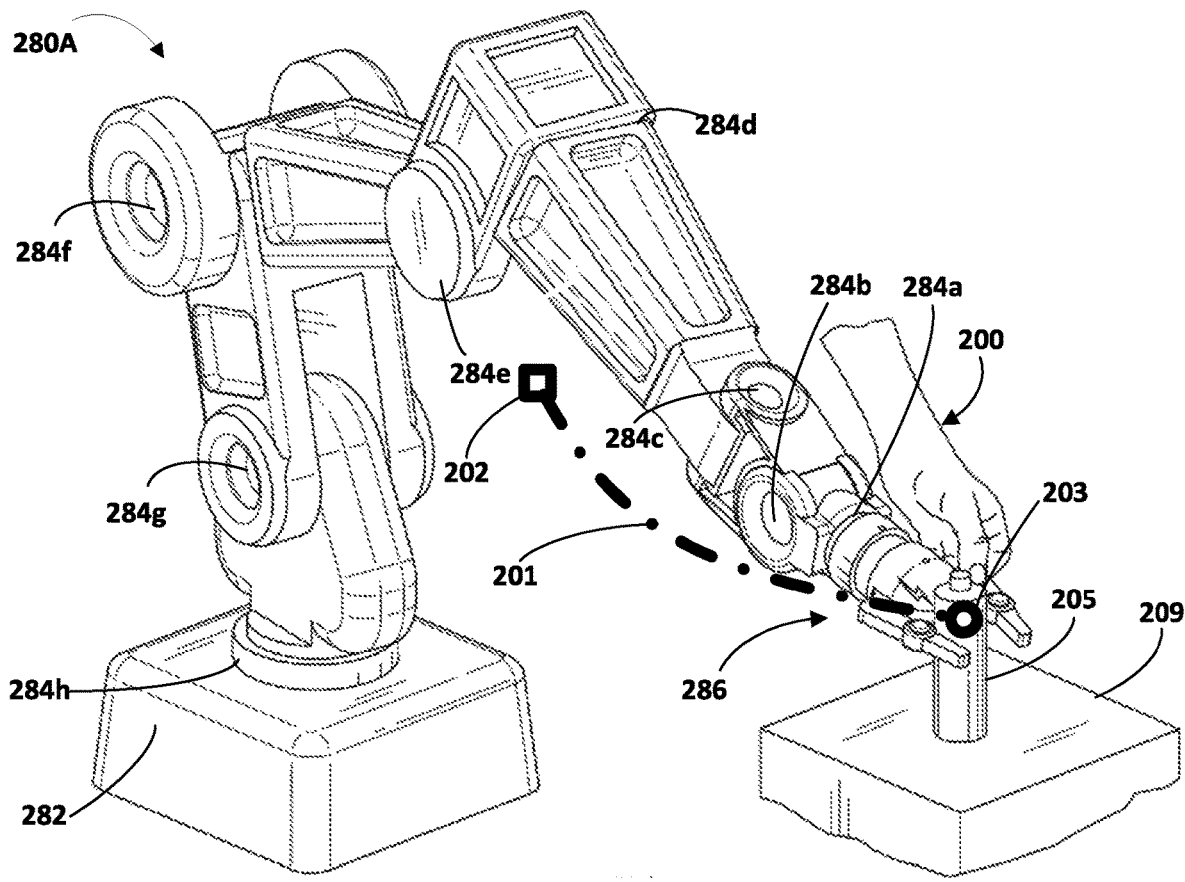
FIG. 2 illustrates an example of a robot that may be utilized in FIG. 1, an example object, and illustrates a user physically manipulating the robot during a kinesthetic teaching.

FIG. 2 illustrates an example of a robot 280A that may be one of the robot(s) 180 utilized in FIG. 1. FIG. 2 also illustrates a user 200 physically grasping an end effector 286 of the robot 280A during physical manipulation of the robot 280A by the user. Also illustrated in FIG. 2 is a spray can 205 resting on a surface 209. As indicated in FIG. 2, the illustrated robot 280A includes a base 282 and eight actuators 284*a*-*h* that provide degrees of freedom for the robot and provide the robot 280A with kinematic redundancy. It is noted that the actual actuators 284*a*-*h* are located "under" the exterior shell of the robot 280A, but are labeled with reference to the exterior shell in FIG. 2 for the sake of simplicity. Robot 280A may include other actuators, such as one or more actuators that control opening/closing of actuable members of end effector 286, but those are not labeled in FIG. 2 for the sake of clarity and brevity. Robot 280A may be physically manipulated by the user 200 to cause the robot 280A traverse any one of a plurality of possible trajectories when moving a reference point of end effector 286 from a starting location to a target location. In some implementations, the robot 280A may be in a gravity compensated mode during all or portions of the physical manipulation of the robot 280A by the user.

The trajectory 201 of FIG. 2 illustrates a trajectory followed by a reference point of the end effector 286 during the demonstration (the trajectory is dictated by the physical manipulation of the robot 280A by the user 200). The demonstration started with the reference point at a starting point 202 and ends, as shown in FIG. 2, with the reference point at a target point 203. Sensor data may be generated by the robot 280A during the demonstration, such as sensor data that indicates the pose (i.e., the position and optionally the orientation) of the end effector 286. The sensor data that indicates the pose of the end effector may be, for example, sensor data from one or more position sensors associated with actuators 284*a*-*h* that control the pose of the end effector. As described herein, the sensor data may be utilized to generate the data points. For example, the data points may be described in joint space (e.g., as the positions of each of the actuators 284*a*-*h*) and/or task space (e.g., as the position and orientation of the end effector 286, as derived from the position sensors).

Although not illustrated, robot 280A may also include and/or be in communication with one or more user interface input devices, such as a button or other user interface element located on an exterior surface of the robot 280A, a virtual user interface element provided via a tablet or other computing device in communication with the robot 280A, and/or a microphone included with the robot 280A and/or in communication with the robot. In some of those implementations a user may provide user interface input via the user interface element to, for example: indicate the initiation and/or conclusion of a demonstration.

Although a particular robot 280A is illustrated in FIG. 2, additional and/or alternative robots may be utilized, including robots having other robot arm forms, robots having a humanoid form, robots that move via one or more wheels (e.g., other self-balancing robots), and so forth. Also, although a particular grasping end effector 286 is illustrated in FIG. 2, additional and/or alternative end effectors may be utilized.

And while manual training of a robot arm is demonstrated in FIG. 2, this is not meant to be limiting. In various implementations, other types of kinesthetic teachings may be employed. For example, in some implementations, a user may operate a graphical user interface of a computing device (e.g., touching a touchscreen with a finger or stylus, using a mouse, etc.) to draw one or more trajectories for reference point of end effector 186 from a starting location to a target location. Additionally or alternatively, movement of a user's appendage, such as the user's arm, could also be captured and used to generate one or more trajectories.

Figure 3A:
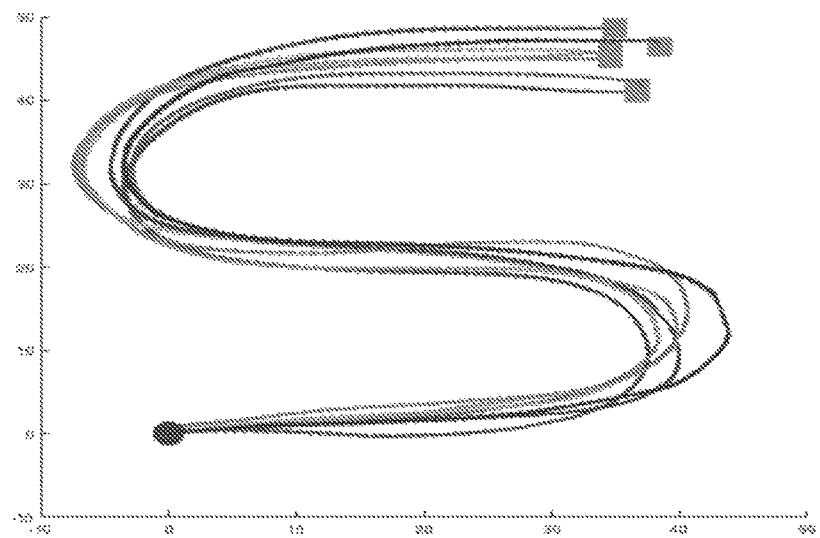
FIG. 3A illustrates seven S-shaped demonstration trajectories of robotic components.

FIG. 3A illustrates seven S-shaped demonstration trajectories of robotic components. The demonstration trajectories of the robotic components may be generated using various methods. For example, the demonstration trajectories of the robotic components may be based on robot sensor data generated during a kinesthetic teaching of one or more robots. As another example, the demonstration trajectories of the robotic components may be based on handwriting samples recorded on a tablet, a personal computer, a laptop, or the like. As yet another example, the demonstration trajectories of the robotic components may be based on data points obtained from a database, data repository, or the like. The control policy system 120 may learn a control policy based on the demonstration trajectories of the robotic components for any pattern.

From the S-shaped demonstration trajectories of the robotic components, the control policy system 120 may determine the starting point and the target point. Each of the demonstration trajectories have a different starting point, but have the same target point. This induces a robust control policy for the control policy system 120 to drive one or more robots by modeling a desired motion for a dynamical system at a kinematic level. Further, the control policy system may determine a pose, or position and orientation, of the end effector 286 in task space, or a position of each of the actuators 284*a*-*h* in joint space.

Figure 3B:
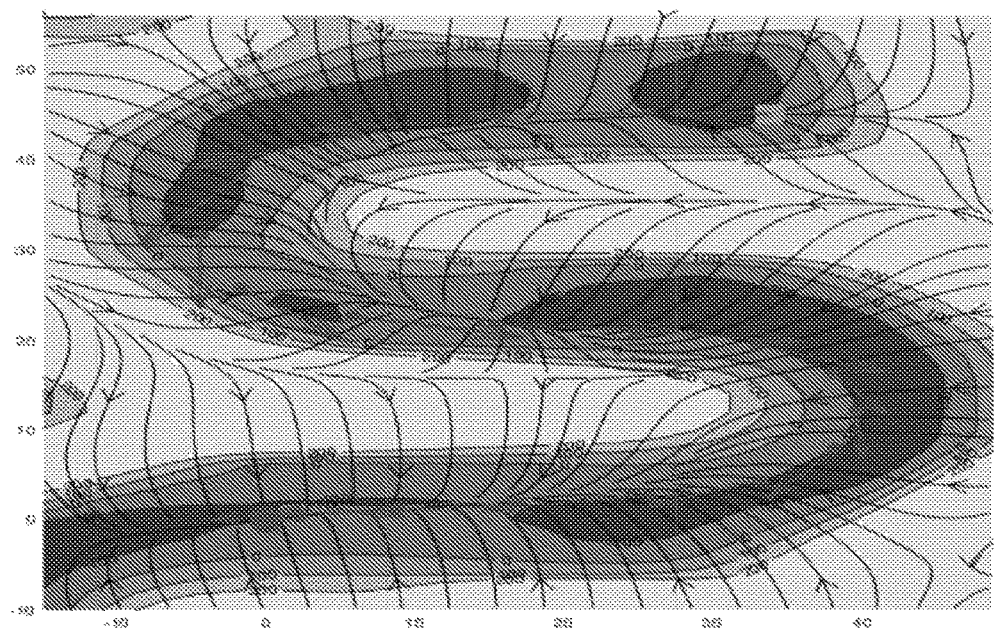
FIG. 3B depicts a learned contracting vector field generated using curl-kernels kernels for the S-shape of FIG. 3A.

FIG. 3B depicts a learned contracting vector field for the S-shaped demonstration trajectories of the robotic components. The learned contracting vector field vector for the S-shaped demonstration trajectories represents the underlying dynamical system at the kinematic level. As illustrated in FIG. 3B, an S-shaped contraction tube is induced about the S-shape, as an intended trajectory, as a result of generating the contracting vector field using curl-free kernels during imitation learning. The generated contracting vector field is represented by the streamlines of FIG. 3B. Further, based on using curl-free kernels during imitation learning, contours of FIG. 3B correspond to the largest eigenvalue of the Jacobian of $f$, where $\dot{x}=f(x)$. Each of the generated contracting vector field, the induced S-shaped contraction tube, and a resulting gradient flow of a potential field based on the largest eigenvalue of the Jacobian of $f$ may define the control policy for the S-shape based on the S-shaped demonstration trajectories of FIG. 3A.

For example, no matter the starting point for an end effector of a robot, even if well outside the intended trajectory for the S-shape, the end effector may follow the contracting vector field defined in the control policy towards the S-shaped contraction tube induced around the intended trajectory for the S-shape as defined by the control policy. By using curl-free kernels, the end effector of the robot may adapt to the dynamic environment faster based on the contours of the gradient flow. In this example, should the robot encounter an obstacle, e.g., a moving or transient object in the dynamic environment, the robot can use the control policy for the S-shape to avoid the obstacle and merge back into the S-shape contraction tube to resume the intended trajectory. Thus, the control policy for the S-shape acts as a function of the target point by creating a region of stability for the intended trajectory around the demonstration trajectories.

Figure 3C:
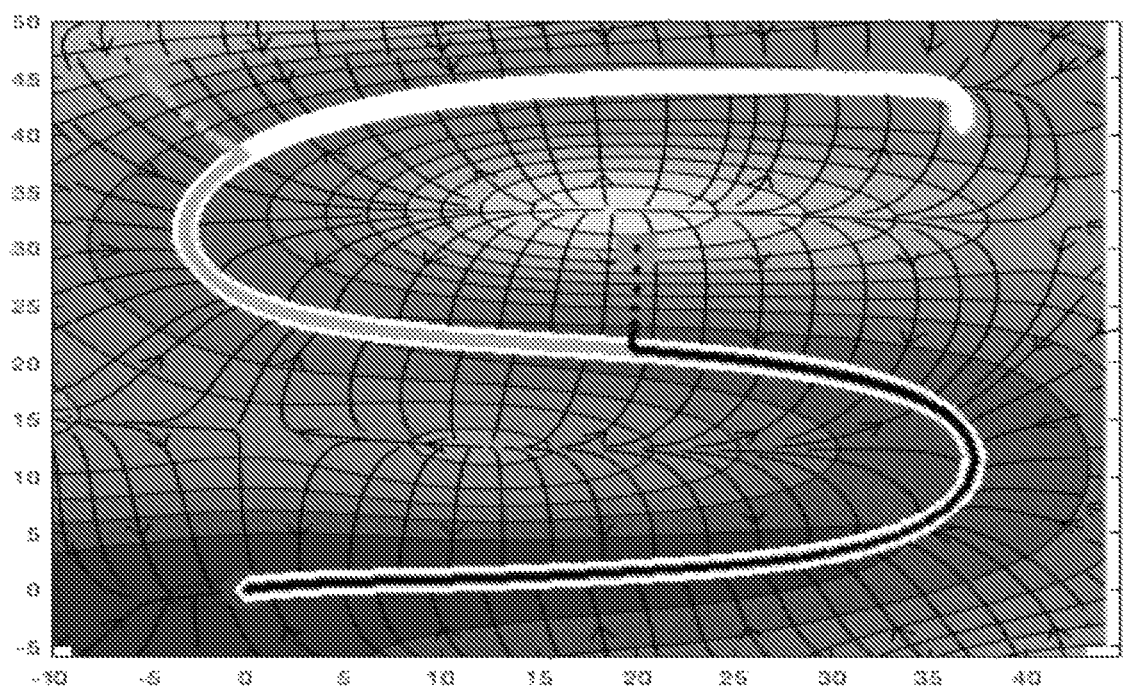
FIG. 3C depicts an incrementally stable contracting vector field for the S-shaped demonstration trajectories of the robotic components in FIG. 3A.

FIG. 3C depicts an incrementally stable contracting vector field for the S-shaped demonstration trajectories of the robotic components in FIG. 3A. FIG. 3C utilizes the contracting vector field, S-shaped contraction tube, and the resulting gradient flow of FIG. 3B to illustrate how an end effector may use the intended trajectory to reach the target point (e.g., the origin (0,0) of FIG. 3C) no matter the starting point.

A first sample starting point is depicted at the beginning of a white line in FIG. 3C. The first sample starting point is near a beginning of the S-shape. By applying the control policy generated in FIG. 3B, an end effector of a robot with the first sample starting point follows the streamlines and the gradient flow to the beginning of the S-shape. From this point, the end effector of the robot with the first sample starting point follows the S-shaped contraction tube to reach the target point.

A second sample starting point is depicted at the beginning of a grey line in FIG. 3C. The second sample starting point is near a first curve of the S-shape. By applying the control policy generated in FIG. 3B, an end effector of a robot with the second sample starting point follows the streamlines and the gradient flow to the first curve of the S-shape. From this point, the end effector of the robot with the second sample starting point follows the S-shaped contraction tube to reach the target point.

A third sample starting point is depicted at the beginning of a black line in FIG. 3C. The third sample starting point is near a mid-point of the S-shape. By applying the control policy generated in FIG. 3B, an end effector of a robot with the third sample starting point follows the streamlines and the gradient flow to the mid-point of the S-shape. From this point, the end effector of the robot with the third sample starting point follows the S-shaped contraction tube to reach the target point.

By using this method, the control policy system is incrementally stabilized because it sets up a region of stability around the demonstration trajectories for a given shape, pattern, or combination thereof. This incremental stability allows the control policy system to better generalize, from any starting point, a control policy and "pull" perturbations toward the intended trajectory in a dynamic environment should the robot encounter an obstacle, e.g., a moving or transient object in the dynamic environment.

FIGS. 4A, 5A, 6A, and 7A illustrate seven demonstration trajectories of robotic components for each of a plurality of shapes. As in FIG. 3A, the demonstration trajectories of the robotic components in FIGS. 4A, 5A, 6A, and 7A may be generated using various methods. For example, the demonstration trajectories of the robotic components for each of the shapes may be based on robot sensor data generated during a kinesthetic teaching of one or more robots. As another example, the demonstration trajectories of the robotic components for each of the shapes may be based on handwriting samples recorded on a tablet, a personal computer, a laptop, or the like. As yet another example, the demonstration trajectories of the robotic components for each of the shapes may be based on data points obtained from a database, data repository, or the like. The control policy system 120 may learn a control policy based on the demonstration trajectories of the robotic components for any pattern.

From the demonstration trajectories of the robotic components for each of the shapes, the control policy system 120 may determine the starting point and the target point for each of the shapes. Each of the demonstration trajectories have a different starting point, but have the same target point. This induces a robust control policy for the control policy system 120 to drive one or more robots by modeling a desired motion for a dynamical system at a kinematic level. Further, the control policy system may determine a pose, or position and orientation, of the end effector 286 in task space, or a position of each of the actuators 284a-h in joint space for each of the shapes.

In addition to the demonstration trajectories of the robotic components for each of the shapes, statistics related to the demonstration trajectories may be generated based on the sensor data. For example, the sensor data may include one or more of an average velocity (S mm/second) of the demonstration trajectories, an average movement duration (T seconds) of the demonstration trajectories, an average position deviation (pos-dev) relative to each of the demonstration trajectories, and an average velocity deviation (speed-dev) relative to each of the demonstration trajectories. Each of the demonstration trajectories of the robotic components for each shape include 1000 position (x) data points and 1000 velocity ($\dot{x}$) data points. These statistics aide the control policy system 120 in generating a contracting vector field for each of the plurality of shapes in FIGS. 3A, 4A, 5A, 6A, and 7A.

Figure 4A:
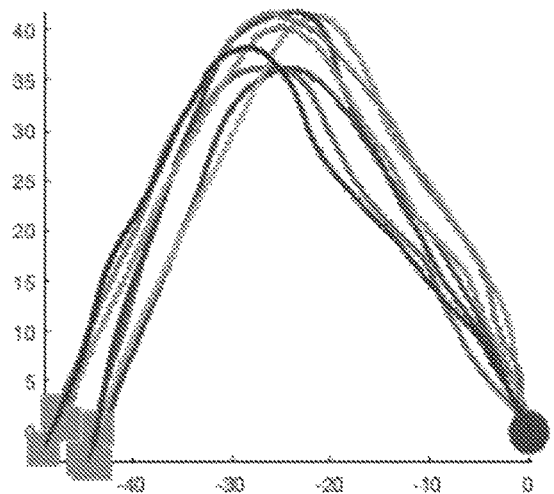
FIGS. 4A, 5A, 6A, and 7A illustrate seven demonstration trajectories of robotic components for each of a plurality of shapes.
Figure 4B:
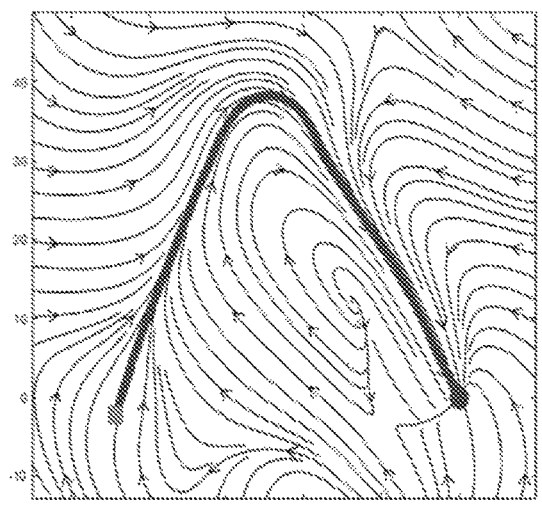
FIGS. 4B, 5B, 6B, and 7B depict a learned contracting vector field generated using Gaussian separable kernels for each of the plurality of shapes in FIGS. 4A, 5A, 6A, and 7A.
Figure 4C:
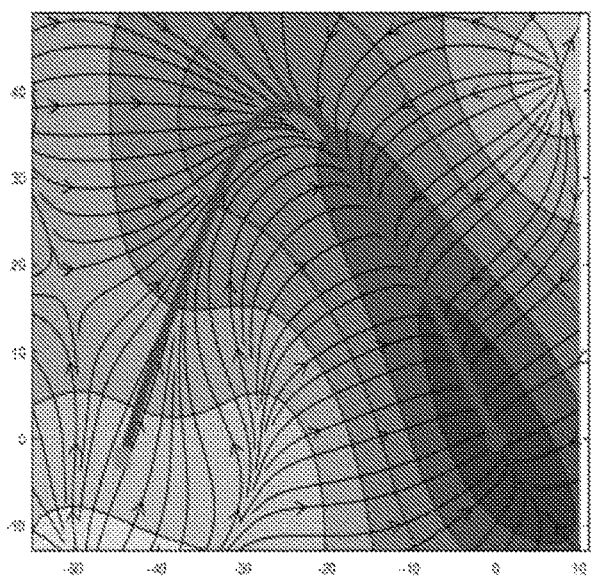
FIGS. 4C, 5C, 6C, and 7C depict a learned contracting vector field generated using curl-kernels kernels for each of the plurality of shapes in FIGS. 4A, 5A, 6A, and 7A.

FIG. 4A illustrates seven A-shaped demonstration trajectories of robotic components. Although the A-shaped demonstration trajectories of the robotic components are illustrated as handwriting samples recorded on a tablet, that is not meant to be limiting. The A-shaped demonstration trajectories may be generated using kinesthetic teaching or generated using any other technique disclosed herein. For the A-shaped demonstration trajectories of FIG. 4A, the average speed is S=30.2 mm/second, the average movement duration is T=3.0 seconds, the average position deviation is pos-dev=3.1, and the average velocity deviation is speed-dev=6.6. Based on these statistics for the 1000 position ($\dot{x}$) data points and 1000 the velocity ($\dot{x}$) data points, a contracting vector field may be generated based on Gaussian separable kernels, as shown in FIG. 4B, or generated based on curl-free kernels, as shown in FIG. 4C.

Figure 5A:
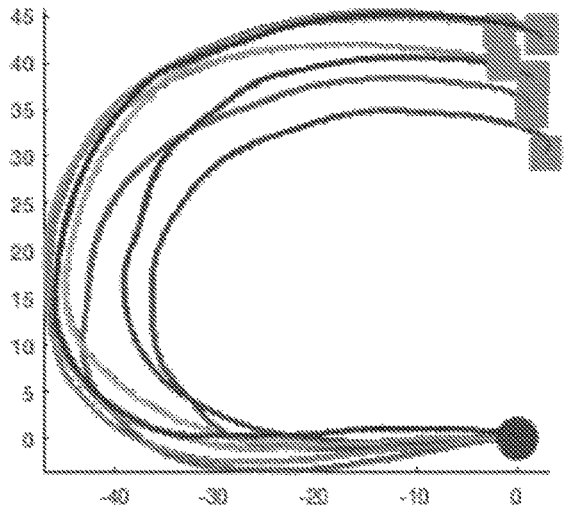
Figure 5B:
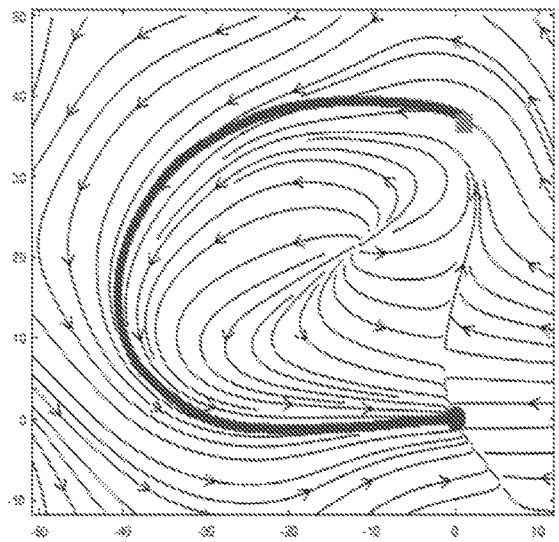
Figure 5C:
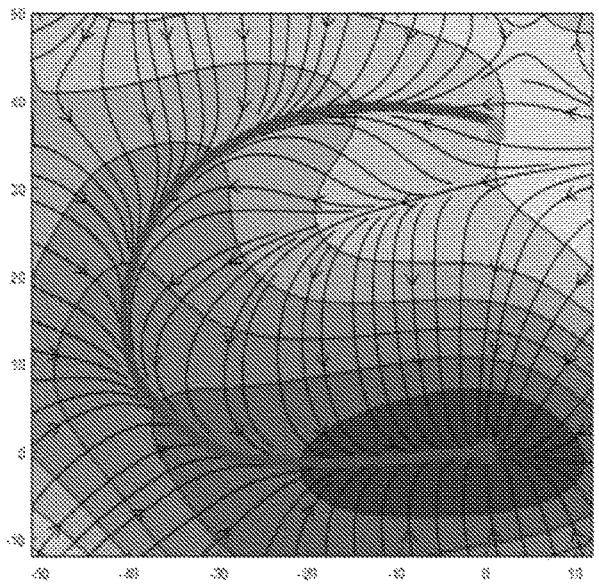

FIG. 5A illustrates seven C-shaped demonstration trajectories of robotic components. Although the A-shaped demonstration trajectories of the robotic components are illustrated as handwriting samples recorded on a tablet, that is not meant to be limiting. The C-shaped demonstration trajectories may be generated using kinesthetic teaching or generated using any other technique disclosed herein. For the C-shaped demonstration trajectories of FIG. 5A, the average speed is S=25.7 mm/second, the average movement duration is T=3.9 seconds, the average position deviation is pos-dev=3.5, and the average velocity deviation is speed-dev=5.6. Based on these statistics for the 1000 position (x) data points and 1000 the velocity ($\dot{x}$) data points, a contracting vector field may be generated based on Gaussian separable kernels, as shown in FIG. 5B, or generated based on curl-free kernels, as shown in FIG. 5C.

Figure 6A:
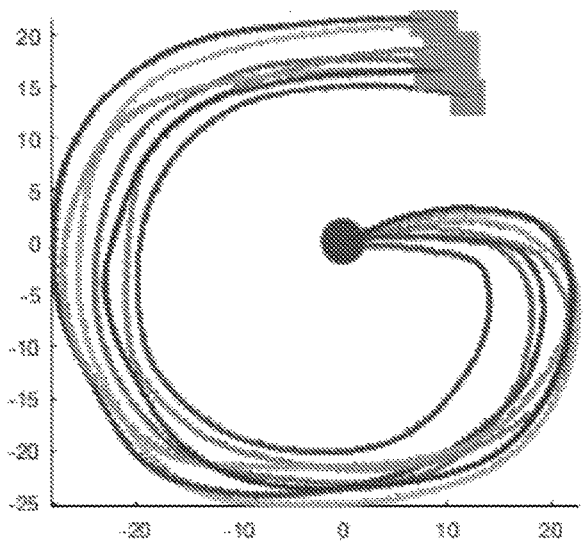
Figure 6B:
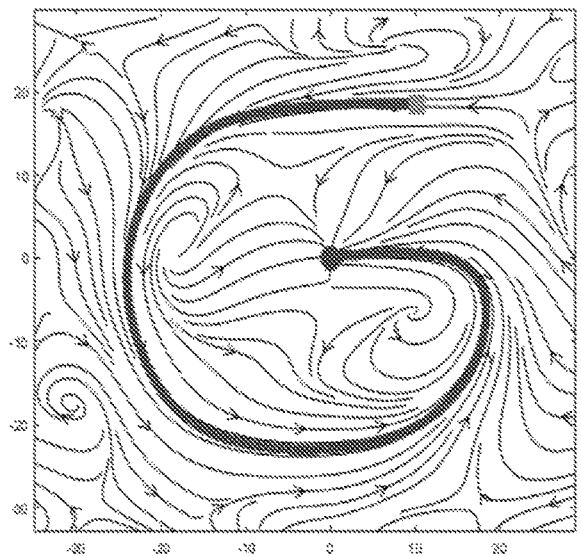
Figure 6C:
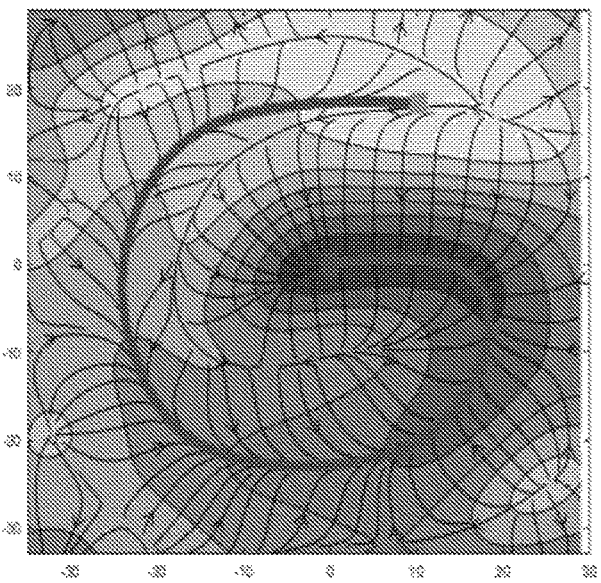

FIG. 6A illustrates seven G-shaped demonstration trajectories of robotic components. Although the G-shaped demonstration trajectories of the robotic components are illustrated as handwriting samples recorded on a tablet, that is not meant to be limiting. The G-shaped demonstration trajectories may be generated using kinesthetic teaching or generated using any other technique disclosed herein. For the G-shaped demonstration trajectories of FIG. 6A, the average speed is S=21.5 mm/second, the average movement duration is T=5.9 seconds, the average position deviation is pos-dev=3.1, and the average velocity deviation is speed-dev=4.2. Based on these statistics for the 1000 position (x) data points and 1000 the velocity (ẋ) data points, a contracting vector field may be generated based on Gaussian separable kernels, as shown in FIG. 6B, or generated based on curl-free kernels, as shown in FIG. 6C.

Figure 7A:
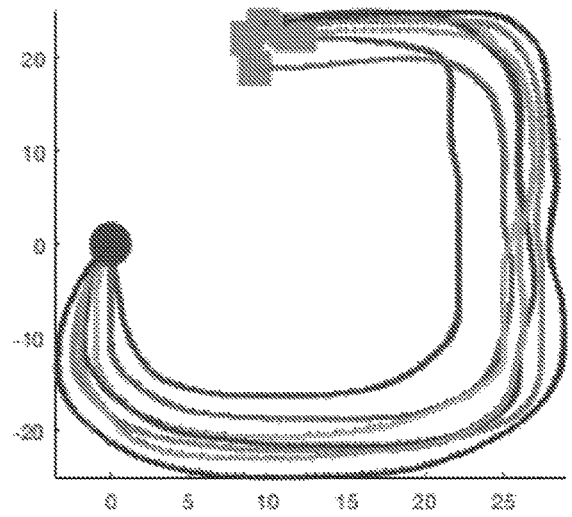
Figure 7B:
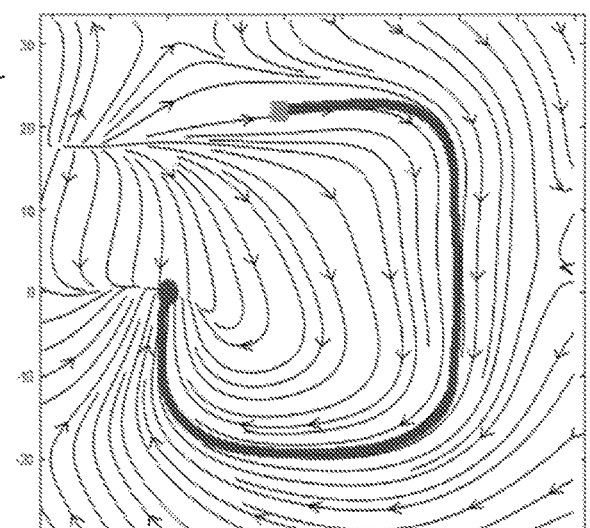
Figure 7C:
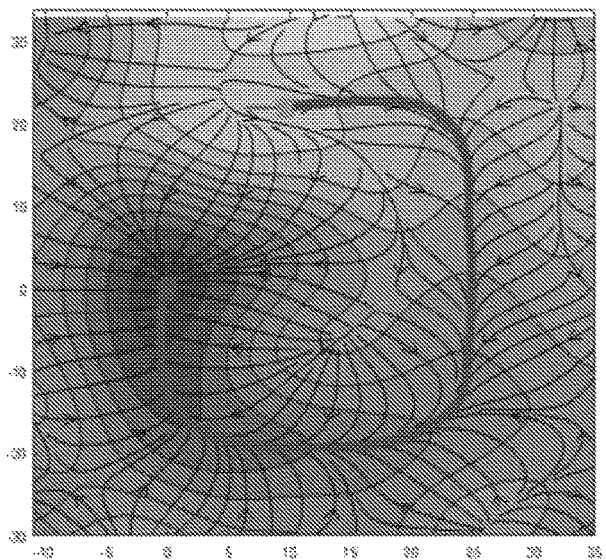

FIG. 7A illustrates seven J-shaped demonstration trajectories of robotic components. Although the J-shaped demonstration trajectories of the robotic components are illustrated as handwriting samples recorded on a tablet, that is not meant to be limiting. The J-shaped demonstration trajectories may be generated using kinesthetic teaching or generated using any other technique disclosed herein. For the J-shaped demonstration trajectories of FIG. 7A, the average speed is S=26.5 mm/second, the average movement duration is T=3.8 seconds, the average position deviation is pos-dev=3.5, and the average velocity deviation is speed-dev=6.7. Based on these statistics for the 1000 position (x) data points and 1000 the velocity (ẋ) data points, a contracting vector field may be generated based on Gaussian separable kernels, as shown in FIG. 7B, or generated based on curl-free kernels, as shown in FIG. 7C.

FIGS. 4B, 5B, 6B, and 7B depict a learned contracting vector field generated using Gaussian separable kernels for each of the plurality of shapes in FIGS. 4A, 5A, 6A, and 7A. The learned contracting vector field generated using Gaussian separable kernels for each of the plurality of shapes in FIGS. 4B, 5B, 6B, and 7B may be generated using techniques disclosed herein.

FIG. 4B depicts the learned contracting vector field for the A-shaped demonstration trajectories of the robotic components. The learned contracting vector field vector for the A-shaped demonstration trajectories represents the underlying dynamical system at the kinematic level. As illustrated in FIG. 4B, an A-shaped contraction tube is induced about the A-shape, as an intended trajectory, as a result of generating the contracting vector field using Gaussian separable kernels during imitation learning. The generated contracting vector field is represented by the streamlines of FIG. 4B. Both of the generated contracting vector field and induced A-shaped contraction tube may define the control policy for the A-shape based on the A-shaped demonstration trajectories of FIG. 4A.

For example, no matter the starting point for an end effector of a robot, even if well outside the intended trajectory for the A-shape, the end effector may follow the contracting vector field defined in the control policy towards the A-shaped contraction tube induced around the intended trajectory for the A-shape as defined by the control policy. In this example, should the robot encounter an obstacle, e.g., a moving or transient object in the dynamic environment, the robot can use the control policy for the A-shape to avoid the obstacle and merge back into the A-shape contraction tube to resume the intended trajectory. Thus, the control policy for the A-shape acts as a function of the target point by creating a region of stability for the intended trajectory around the demonstration trajectories.

FIG. 5B depicts the learned contracting vector field for the C-shaped demonstration trajectories of the robotic components. The learned contracting vector field vector for the C-shaped demonstration trajectories represents the underlying dynamical system at the kinematic level. As illustrated in FIG. 5B, a C-shaped contraction tube is induced about the C-shape, as an intended trajectory, as a result of generating the contracting vector field using Gaussian separable kernels during imitation learning. The generated contracting vector field is represented by the streamlines of FIG. 5B. Both of the generated contracting vector field and induced C-shaped contraction tube may define the control policy for the C-shape based on the C-shaped demonstration trajectories of FIG. 5A.

For example, no matter the starting point for an end effector of a robot, even if well outside the intended trajectory for the C-shape, the end effector may follow the contracting vector field defined in the control policy towards the C-shaped contraction tube induced around the intended trajectory for the C-shape as defined by the control policy. In this example, should the robot encounter an obstacle, e.g., a moving or transient object in the dynamic environment, the robot can use the control policy for the C-shape to avoid the obstacle and merge back into the C-shape contraction tube to resume the intended trajectory. Thus, the control policy for the C-shape acts as a function of the target point by creating a region of stability for the intended trajectory around the demonstration trajectories.

FIG. 6B depicts the learned contracting vector field for the G-shaped demonstration trajectories of the robotic components. The learned contracting vector field vector for the G-shaped demonstration trajectories represents the underlying dynamical system at the kinematic level. As illustrated in FIG. 6B, a G-shaped contraction tube is induced about the G-shape, as an intended trajectory, as a result of generating the contracting vector field using Gaussian separable kernels during imitation learning. The generated contracting vector field is represented by the streamlines of FIG. 6B. Both of the generated contracting vector field and induced G-shaped contraction tube may define the control policy for the G-shape based on the G-shaped demonstration trajectories of FIG. 6A.

For example, no matter the starting point for an end effector of a robot, even if well outside the intended trajectory for the G-shape, the end effector may follow the contracting vector field defined in the control policy towards the G-shaped contraction tube induced around the intended trajectory for the G-shape as defined by the control policy. In this example, should the robot encounter an obstacle, e.g., a moving or transient object in the dynamic environment, the robot can use the control policy for the G-shape to avoid the obstacle and merge back into the G-shape contraction tube to resume the intended trajectory. Thus, the control policy for the G-shape acts as a function of the target point by creating a region of stability for the intended trajectory around the demonstration trajectories.

FIG. 7B depicts the learned contracting vector field for the J-shaped demonstration trajectories of the robotic components. The learned contracting vector field vector for the J-shaped demonstration trajectories represents the underlying dynamical system at the kinematic level. As illustrated in FIG. 7B, a J-shaped contraction tube is induced about the J-shape, as an intended trajectory, as a result of generating the contracting vector field using Gaussian separable kernels during imitation learning. The generated contracting vector field is represented by the streamlines of FIG. 7B. Both of the generated contracting vector field and induced J-shaped contraction tube may define the control policy for the J-shape based on the J-shaped demonstration trajectories of FIG. 7A.

For example, no matter the starting point for an end effector of a robot, even if well outside the intended trajectory for the J-shape, the end effector may follow the contracting vector field defined in the control policy towards the J-shaped contraction tube induced around the intended trajectory for the J-shape as defined by the control policy. In this example, should the robot encounter an obstacle, e.g., a moving or transient object in the dynamic environment, the robot can use the control policy for the J-shape to avoid the obstacle and merge back into the J-shape contraction tube to resume the intended trajectory. Thus, the control policy for the J-shape acts as a function of the target point by creating a region of stability for the intended trajectory around the demonstration trajectories.

FIGS. 4C, 5C, 6C, and 7C depict a learned contracting vector field generated using curl-kernels kernels for each of the plurality of shapes in FIGS. 4A, 5A, 6A, and 7A. The learned contracting vector field generated using curl-kernels kernels for each of the plurality of shapes in FIGS. 4C, 5C, 6C, and 7C may be generated using techniques disclosed herein.

Generating a contracting vector field using curl-free kernels, as opposed to Gaussian separable kernels, has several advantages. First, by using curl-free kernels, a potential field may be generated, such that the contracting vector field may be interpreted as a gradient flow with respect to the potential field as set forth in Equation 10. Second, by using curl-free kernels and as a result of the potential field, a larger contraction tube with streamlined gradients may be induced about each of the shapes in FIGS. 4A, 5A, 6A, and 7A. Although there are more advantages of using curl-free kernels described herein, these advantages are visually represented in FIGS. 4C, 5C, 6C, and 7C and are not meant to be limiting.

FIG. 4C depicts the learned contracting vector field for the A-shaped demonstration trajectories of the robotic components. The learned contracting vector field vector for the A-shaped demonstration trajectories represents the underlying dynamical system at the kinematic level. As illustrated in FIG. 4C, an A-shaped contraction tube is induced about the A-shape, as an intended trajectory, as a result of generating the contracting vector field using curl-free kernels during imitation learning. The generated contracting vector field is represented by the streamlines of FIG. 4C. Further, based on using curl-free kernels during imitation learning, contours of FIG. 4C correspond to an associated potential field that is interpreted as a gradient flow with respect to the generated contracting vector field. Each of the generated contracting vector field, the induced A-shaped contraction tube, and the resulting gradient flow may define the control policy for the A-shape based on the A-shaped demonstration trajectories of FIG. 4A.

For example, no matter the starting point for an end effector of a robot, even if well outside the intended trajectory for the A-shape, the end effector may follow the contracting vector field defined in the control policy towards the A-shaped contraction tube induced around the intended trajectory for the A-shape as defined by the control policy. By using curl-free kernels, the end effector of the robot may adapt to the dynamic environment faster based on the contours of the gradient flow. In this example, should the robot encounter an obstacle, e.g., a moving or transient object in the dynamic environment, the robot can use the control policy for the A-shape to avoid the obstacle and merge back into the A-shape contraction tube to resume the intended trajectory. Thus, the control policy for the A-shape acts as a function of the target point.

FIG. 5C depicts the learned contracting vector field for the C-shaped demonstration trajectories of the robotic components. The learned contracting vector field vector for the C-shaped demonstration trajectories represents the underlying dynamical system at the kinematic level. As illustrated in FIG. 5C, an C-shaped contraction tube is induced about the C-shape, as an intended trajectory, as a result of generating the contracting vector field using curl-free kernels during imitation learning. The generated contracting vector field is represented by the streamlines of FIG. 5C. Further, based on using curl-free kernels during imitation learning, contours of FIG. 5C correspond to an associated potential field that is interpreted as a gradient flow with respect to the generated contracting vector field. Each of the generated contracting vector field, the induced C-shaped contraction tube, and the resulting gradient flow may define the control policy for the C-shape based on the C-shaped demonstration trajectories of FIG. 5A.

For example, no matter the starting point for an end effector of a robot, even if well outside the intended trajectory for the C-shape, the end effector may follow the contracting vector field defined in the control policy towards the C-shaped contraction tube induced around the intended trajectory for the C-shape as defined by the control policy. By using curl-free kernels, the end effector of the robot may adapt to the dynamic environment faster based on the contours of the gradient flow. In this example, should the robot encounter an obstacle, e.g., a moving or transient object in the dynamic environment, the robot can use the control policy for the C-shape to avoid the obstacle and merge back into the C-shape contraction tube to resume the intended trajectory. Thus, the control policy for the C-shape acts as a function of the target point.

FIG. 6C depicts the learned contracting vector field for the G-shaped demonstration trajectories of the robotic components. The learned contracting vector field vector for the G-shaped demonstration trajectories represents the underlying dynamical system at the kinematic level. As illustrated in FIG. 6C, an G-shaped contraction tube is induced about the G-shape, as an intended trajectory, as a result of generating the contracting vector field using curl-free kernels during imitation learning. The generated contracting vector field is represented by the streamlines of FIG. 6C. Further, based on using curl-free kernels during imitation learning, contours of FIG. 6C correspond to an associated potential field that is interpreted as a gradient flow with respect to the generated contracting vector field. Each of the generated contracting vector field, the induced G-shaped contraction tube, and the resulting gradient flow may define the control policy for the G-shape based on the G-shaped demonstration trajectories of FIG. 6A.

For example, no matter the starting point for an end effector of a robot, even if well outside the intended trajectory for the G-shape, the end effector may follow the contracting vector field defined in the control policy towards the G-shaped contraction tube induced around the intended trajectory for the G-shape as defined by the control policy. By using curl-free kernels, the end effector of the robot may adapt to the dynamic environment faster based on the contours of the gradient flow. In this example, should the robot encounter an obstacle, e.g., a moving or transient object in the dynamic environment, the robot can use the control policy for the G-shape to avoid the obstacle and merge back into the G-shape contraction tube to resume the intended trajectory. Thus, the control policy for the G-shape acts as a function of the target point.

FIG. 7C depicts the learned contracting vector field for the J-shaped demonstration trajectories of the robotic components. The learned contracting vector field vector for the J-shaped demonstration trajectories represents the underlying dynamical system at the kinematic level. As illustrated in FIG. 7C, an J-shaped contraction tube is induced about the J-shape, as an intended trajectory, as a result of generating the contracting vector field using curl-free kernels during imitation learning. The generated contracting vector field is represented by the streamlines of FIG. 7C. Further, based on using curl-free kernels during imitation learning, contours of FIG. 7C correspond to an associated potential field that is interpreted as a gradient flow with respect to the generated contracting vector field. Each of the generated contracting vector field, the induced J-shaped contraction tube, and the resulting gradient flow may define the control policy for the J-shape based on the J-shaped demonstration trajectories of FIG. 7A.

For example, no matter the starting point for an end effector of a robot, even if well outside the intended trajectory for the J-shape, the end effector may follow the contracting vector field defined in the control policy towards the J-shaped contraction tube induced around the intended trajectory for the J-shape as defined by the control policy. By using curl-free kernels, the end effector of the robot may adapt to the dynamic environment faster based on the contours of the gradient flow. In this example, should the robot encounter an obstacle, e.g., a moving or transient object in the dynamic environment, the robot can use the control policy for the J-shape to avoid the obstacle and merge back into the J-shape contraction tube to resume the intended trajectory. Thus, the control policy for the J-shape acts as a function of the target point.

Although FIGS. 3A, 4A, 5A, 6A, and 7A all illustrate patterns of alphanumeric characters as demonstration trajectories, it is to be understood that any shape, pattern, or combination thereof may be used as demonstration trajectories to generate a contracting vector field for any intended trajectory of an end effector of one or more robots.

Figure 8A:
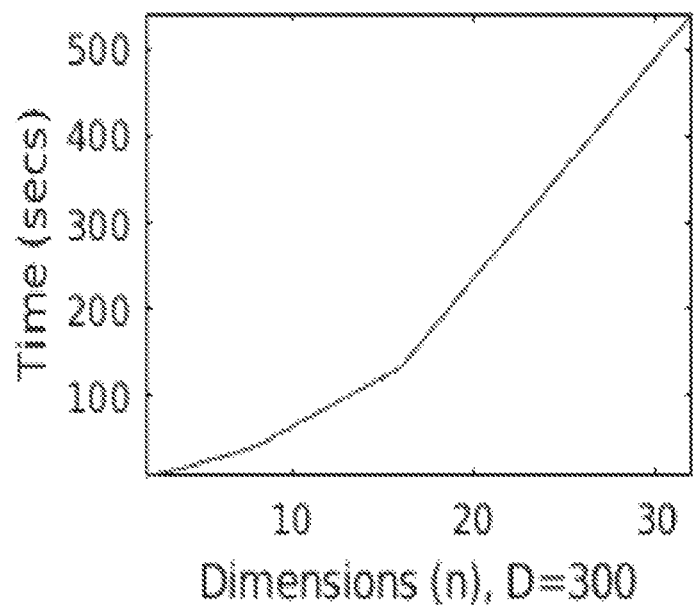
FIG. 8A is a graph that illustrates how training time for a control system scales with increasing dimensionality and a fixed number of random features in a random two-dimensional subspace.

FIG. 8A is a graph that illustrates how training time for a control system scales with increasing dimensionality and a fixed number of random features in a random two-dimensional subspace. The training time, dimensionality, and number of random features in FIG. 8A is based on the S-shape of FIG. 3A. In FIG. 8A, the data points of the S-shape of FIG. 3A are embedded into a random two-dimensional subspace of $\mathbb{R}^n$, where n=2, 4, 8, 16, and 32 for D=300 fixed, curl-free random features.

Figure 8B:
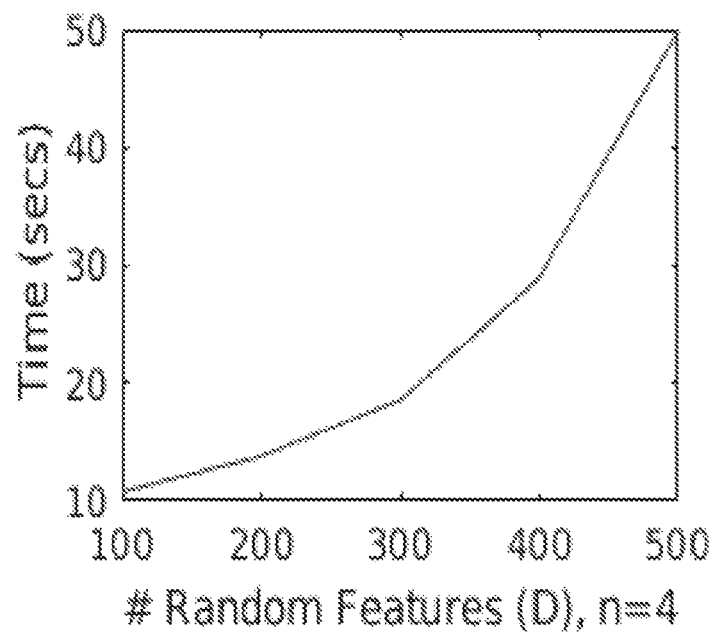
FIG. 8B is a graph that illustrates how training time for a control system scales with an increasing number of random features and a fixed dimensionality in a random two-dimensional subspace.

FIG. 8B is a graph that illustrates how training time for a control system scales with an increasing number of random features and a fixed dimensionality in a random two-dimensional subspace. The training time, dimensionality, and number of random features in FIG. 8B is based on the S-shape of FIG. 3A. In FIG. 8A, the data points of the S-shape of FIG. 3A are embedded into a random two-dimensional subspace of $\mathbb{R}^n$, where n=4 and 32 as D increased to from 100 to 500 curl-free random features.

The training for the control policy system was conducted for 6000 iterations. FIGS. 8A-8B illustrate how training time for a control system scales linearly with respect to the number of random features, and how training time for a control system scales superlinearly with respect to dimensionality. These results confirm that utilizing contracting vector fields generated using Gaussian separable kernels or curl-free kernels during imitation learning is a practical approach for learning higher dimensional dynamical systems.

Figure 9:
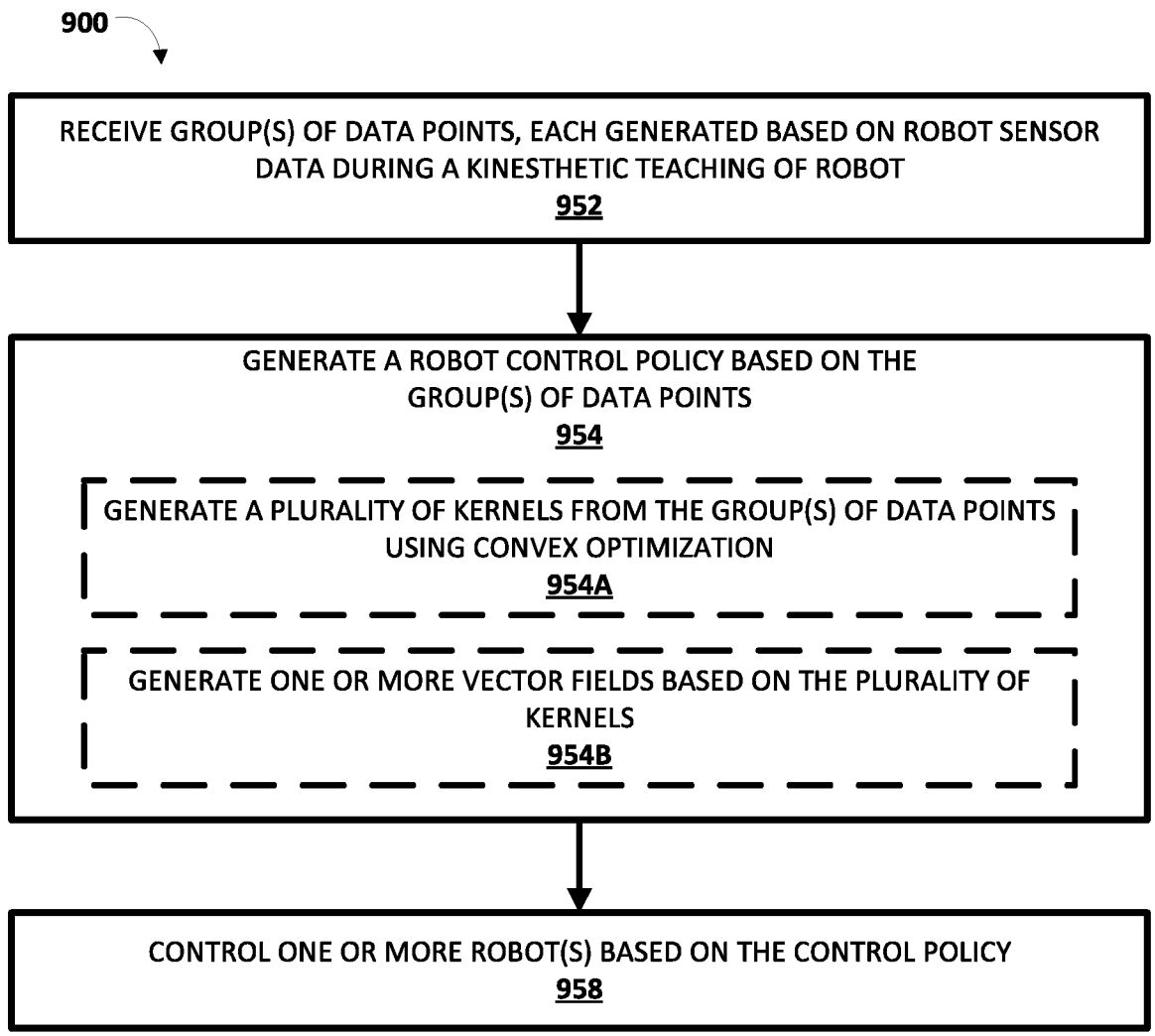
FIG. 9 is a flowchart illustrating an example method according to various implementations disclosed herein.

FIG. 9 is a flowchart illustrating an example method 900 according to various implementations described herein. For convenience, the operations of the flow chart are described with reference to a system that performs the operations. This system may include engines 122 and/or 124 of control policy system 120, which may be implemented by one or more components of a robot, such as a processor and/or robot control system of one or more of the robots 280; and/or may be implemented by one or more computing device(s) that are separate from a robot, such as computing system 1110. Moreover, while operations of method 900 are shown in a particular order, this is not meant to be limiting. One or more operations may be reordered, omitted, or added.

At block 952, the system receives one or more groups of data points. Each group of data points is generated based on robot sensor data during a physical manipulation of a corresponding robot. As one example, the system can receive one group of data points that are based on a kinesthetic teaching of a demonstration performed on a corresponding robot. As another example, the system can receive a first group of data points and a second group of data points. The first group can be based on a first kinesthetic teaching performed on a corresponding robot. The second group can be based on a second kinesthetic teaching performed on the same corresponding robot, or on a different corresponding robot.

At block 954, the system generates a robot control policy based on the group(s) of data points received at block 952. In some implementations, at sub-block 954A, the system may generate a plurality of kernels from the group(s) of data point using convex optimization, where the kernels may be Gaussian separable kernels or curl-free kernels. In some implementations, at sub-block 954B, the system may generate one or more vector fields based on the plurality of kernels generated at sub-block 954A.

At block 958, the system controls one or more robots based on the control policy. For example, in some implementations the control policy directly corresponds to the actual torque commands that should be sent by a robot control system to the actuators. In those implementations, in generating torque commands at a given time instant, the system can apply the state variables of a robot at that time instant to the control policy to generate torque commands, and provide those torque commands to its actuators. In some other implementations, the system can use an operational space formulation and/or other formulations to determine torque commands and/or other control commands based on the control policy.

Method 900 sets forth an example according to implementations disclosed herein. However, as set forth above, in some implementations one or more operations may be reordered, omitted, or added. As one example, in some implementations block 952 may be omitted. As another example, in some implementations block 954 may be omitted and block 956 may include the system generating the plurality of kernels from the group(s) of data points using convex optimization, but omit generating one or more of the vector fields based on the plurality of kernels.

Figure 10:
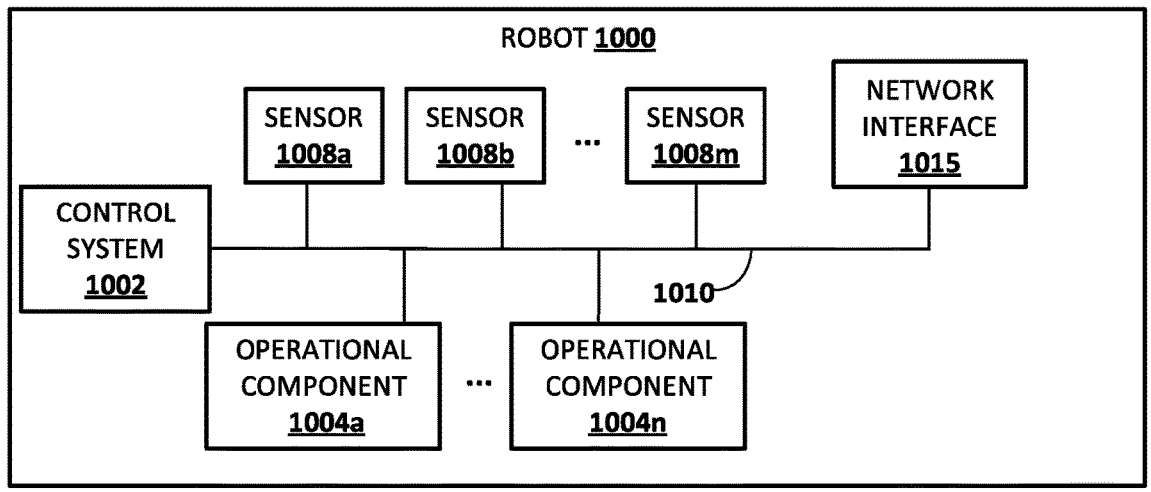
FIG. 10 schematically depicts an example architecture of a robot.

FIG. 10 schematically depicts an example architecture of a robot 1000. The robot 1000 includes a robot control system 1002, one or more operational components 1004a-n, and one or more sensors 1008a-m. The sensors 1008a-m may include, for example, vision sensors (e.g., camera(s), 3D scanners), light sensors, pressure sensors, positional sensors, pressure wave sensors (e.g., microphones), proximity sensors, accelerometers, gyroscopes, thermometers, barometers, and so forth. While sensors 1008a-m are depicted as being integral with robot 1000, this is not meant to be limiting. In some implementations, sensors 1008a-m may be located external to robot 1000, e.g., as standalone units.

Operational components 1004a-n may include, for example, one or more end effectors (e.g., grasping end effectors) and/or one or more servo motors or other actuators to effectuate movement of one or more components of the robot. For example, the robot 1000 may have multiple degrees of freedom and each of the actuators may control actuation of the robot 1000 within one or more of the degrees of freedom responsive to control commands provided by the robot control system 1002 (e.g., torque and/or other commands generated based on a control policy). As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 1002 may be implemented in one or more processors, such as a CPU, GPU, and/or other controller(s) of the robot 1000. In some implementations, the robot 1000 may comprise a "brain box" that may include all or aspects of the control system 1002. For example, the brain box may provide real time bursts of data to the operational components 1004a-n, with each of the real time bursts comprising a set of one or more control commands that dictate, inter alia, the parameters of motion (if any) for each of one or more of the operational components 1004a-n. As described herein, the control commands can be at least selectively generated by the control system 1002 based on a control policy generated according to one or more techniques disclosed herein.

Although control system 1002 is illustrated in FIG. 10 as an integral part of the robot 1000, in some implementations, all or aspects of the control system 1002 may be implemented in a component that is separate from, but in communication with, robot 1000. For example, all or aspects of control system 1002 may be implemented on one or more computing devices that are in wired and/or wireless communication with the robot 1000, such as computing system 1110.

Figure 11:
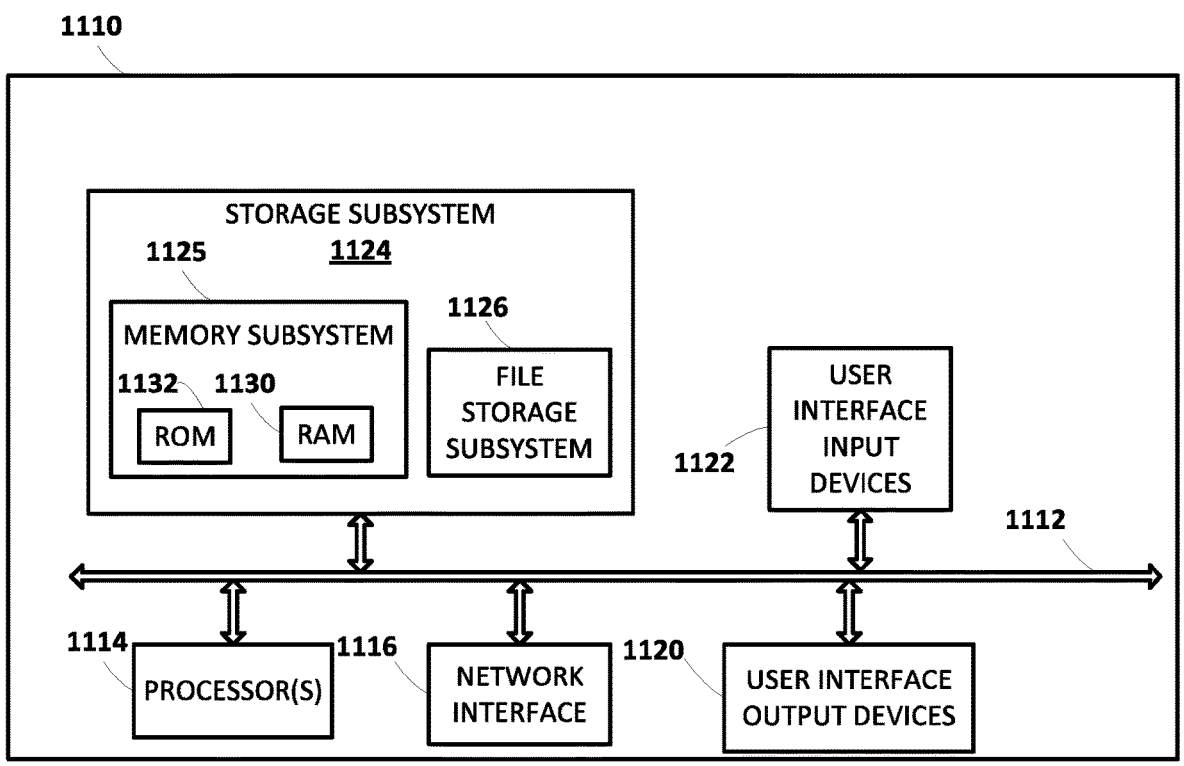
FIG. 11 schematically depicts an example architecture of a computer system.

FIG. 11 is a block diagram of an example computing system 1110 that may optionally be utilized to perform one or more aspects of techniques described herein. The computing system 1110 typically includes at least one processor 1114 which communicates with a number of peripheral devices via bus subsystem 1112. These peripheral devices may include a storage subsystem 1124, including, for example, a memory subsystem 1125 and a file storage subsystem 1126, user interface output devices 1120, user interface input devices 1122, and a network interface subsystem 1116. The input and output devices allow user interaction with the computing system 1110. Network interface subsystem 1116 provides an interface to outside networks and is coupled to corresponding interface devices in other computing devices.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the computing system 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the computing system 1110 to the user or to another machine or computing device.

Storage subsystem 1124 stores programming and data constructs that provide the functionality of some or all of the modules described herein. For example, the storage subsystem 824 may include the logic to perform selected aspects of the method 900 of FIG. 9.

These software modules are generally executed by processor 1114 alone or in combination with other processors. Memory 1125 used in the storage subsystem 1124 can include a number of memories including a main random access memory (RAM) 1130 for storage of instructions and data during program execution and a read only memory (ROM) 1132 in which fixed instructions are stored. A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 1124, or in other machines accessible by the processor(s) 1114.

Bus subsystem 1112 provides a mechanism for letting the various components and subsystems of the computing system 1110 communicate with each other as intended. Although bus subsystem 1112 is shown schematically as a single bus, alternative implementations of the bus subsystem may use multiple busses.

The computing system 1110 can be of varying types including a workstation, server, computing cluster, blade server, server farm, or any other data processing system or computing device. Due to the ever-changing nature of computers and networks, the description of the computing system 1110 depicted in FIG. 11 is intended only as a specific example for purposes of illustrating some implementations. Many other configurations of the computing system 1110 are possible having more or fewer components than the computing device depicted in FIG. 11.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
    receiving a group of data points generated based on sensor data from one or more sensors obtained during imitation learning of a robot trajectory, wherein the imitation learning includes physical manipulation of a reference point from an initial point to a target point;
    generating a dynamical systems control policy that regulates both robot motion and robot interaction with an environment, wherein generating the dynamical systems control policy comprises:
        generating a plurality of kernels based on the group of data points, wherein the plurality of kernels are generated based on convex optimization, wherein the plurality of kernels comprise curl-free kernels, and
        generating one or more vector fields based on the plurality of kernels, wherein the one or more vector fields collectively form the dynamical systems control policy; and controlling one or more robots based on the dynamical systems control policy.

2. The method of claim 1, wherein the dynamical systems control policy comprises one or more differential equations.

3. The method of claim 2, wherein the plurality of kernels are matrix-valued kernels.

4. The method of claim 3, wherein equilibria of the plurality of kernels are placed at respective data points of the group of data points.

5. The method of claim 1, wherein the plurality of kernels comprise neural networks.

6. The method of claim 1, wherein the one or more vector fields comprise a plurality of Reproducing Kernel Hilbert spaces (RKHS) associated with the plurality of kernels.

7. A method implemented by one or more processors, comprising:
    receiving a group of data points generated based on sensor data from one or more sensors obtained during imitation learning of a robot trajectory, wherein the imitation learning includes physical manipulation of a reference point from an initial point to a target point;
    generating a dynamical systems control policy that regulates both robot motion and robot interaction with an environment, wherein generating the dynamical systems control policy comprises:
    generating a plurality of kernels based on the group of data points, wherein the plurality of kernels are generated based on convex optimization wherein the plurality of kernels comprise Gaussian separable kernels, and
    generating one or more vector fields based on the plurality of kernels, wherein the one or more vector fields collectively form the dynamical systems control policy; and controlling one or more robots based on the dynamical systems control policy.

8. A control system, comprising:
    one or more robots;
    memory storing instruction; and
    one or more processors operable to execute the instructions stored in the memory, comprising instructions to:
    receive a group of data points generated based on sensor data from one or more sensors obtained during imitation learning of a robot trajectory, wherein the imitation learning includes physical manipulation of a reference point from an initial point to a target point;
    generate a dynamical systems control policy that regulates both robot motion and robot interaction with an environment, wherein generating the dynamical systems control policy comprises:
        generate a plurality of kernels based on the group of data points, wherein the plurality of kernels are generated based on convex optimization, wherein the plurality of kernels comprise curl-free kernels, and
        generate one or more vector fields based on the plurality of kernels, wherein the one or more vector fields collectively form the dynamical systems control policy; and
    control one or more of the robots based on the dynamical systems control policy.

9. The control system of claim 8, wherein the dynamical systems control policy comprises one or more differential equations.

10. The control system of claim 9, wherein the plurality of kernels are matrix-valued kernels.

11. The control system of claim 10, wherein equilibria of the plurality of kernels are placed at respective data points of the group of data points.

12. The control system of claim 8, wherein the plurality of kernels comprise at least one of: neural networks or Gaussian separable kernels.

13. The control system of claim 8, wherein the one or more vector fields comprise a plurality of Reproducing Kernel Hilbert spaces (RKHS) associated with the plurality of kernels.

14. A non-transitory computer-readable storage medium comprising instructions that, when executed, cause at least one processor to:
    receive a group of data points generated based on sensor data from one or more sensors obtained during imitation learning of a robot trajectory, wherein the imitation learning includes physical manipulation of a reference point from an initial point to a target point;
    generate a dynamical systems control policy that regulates both robot motion and robot interaction with an environment, wherein generating the dynamical systems control policy comprises:
    generate a plurality of kernels based on the group of data points, wherein the plurality of kernels are generated based on convex optimization, wherein the plurality of kernels comprise curl-free kernels, and
    generate one or more vector fields based on the plurality of kernels, wherein the one or more vector fields collectively form the dynamical systems control policy; and
    control one or more of the robots based on the dynamical systems control policy.

15. The non-transitory computer-readable storage medium of claim 14, wherein the dynamical systems control policy comprises one or more differential equations.

16. The non-transitory computer-readable storage medium of claim 15, wherein the plurality of kernels are matrix-valued kernels.

17. The non-transitory computer-readable storage medium of claim 16, wherein equilibria of the plurality of kernels are placed at respective data points of the group of data points.

18. The non-transitory computer-readable storage medium of claim 14, wherein the plurality of kernels comprise at least one of: neural networks or Gaussian separable kernels.

19. The non-transitory computer-readable storage medium of claim 14, wherein the one or more vector fields comprise a plurality of Reproducing Kernel Hilbert spaces (RKHS) associated with the plurality of kernels.

* * * * *